United States Patent
Szarecki et al.

(10) Patent No.: US 11,546,246 B2
(45) Date of Patent: *Jan. 3, 2023

(54) MINIMIZING OR REDUCING TRAFFIC LOSS WHEN AN EXTERNAL BORDER GATEWAY PROTOCOL (EBGP) PEER GOES DOWN

(71) Applicant: Juniper Networks, Inc., Sunnyvale, CA (US)

(72) Inventors: Rafal Jan Szarecki, San Jose, CA (US); Kaliraj Vairavakkalai, Fremont, CA (US); Natrajan Venkataraman, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 17/105,291

(22) Filed: Nov. 25, 2020

(65) Prior Publication Data

US 2021/0083963 A1 Mar. 18, 2021

Related U.S. Application Data

(63) Continuation of application No. 16/289,514, filed on Feb. 28, 2019, now Pat. No. 10,917,330.

(Continued)

(51) Int. Cl.
*H04L 12/28* (2006.01)
*H04L 45/02* (2022.01)
(Continued)

(52) U.S. Cl.
CPC .............. *H04L 45/04* (2013.01); *H04L 12/66* (2013.01); *H04L 45/20* (2013.01); *H04L 45/507* (2013.01); *H04L 45/748* (2013.01)

(58) Field of Classification Search
CPC ......... H04L 45/04; H04L 12/66; H04L 45/20; H04L 45/507; H04L 45/748; H04L 45/28
See application file for complete search history.

(56) References Cited

U.S. PATENT DOCUMENTS

| | | | |
|---|---|---|---|
| 7,945,658 B1 * | 5/2011 | Nucci | H04L 41/22 709/239 |
| 8,619,774 B2 * | 12/2013 | Nalawade | H04L 12/4641 370/409 |

(Continued)

*Primary Examiner* — Luat Phung
(74) *Attorney, Agent, or Firm* — John C. Pokotylo; Pokotylo Patent Services

(57) ABSTRACT

A router configured as an autonomous system border router (ASBR) in a local autonomous system (AS), includes: (1) a control component for communicating and computing routing information, the control component running a Border Gateway Protocol (BGP) and peering with at least one BGP peer device in an outside autonomous system (AS) different from the local AS; and (2) a forwarding component for forwarding packets using forwarding information derived from the routing information computed by the control component, wherein the control component (i) receives reachability information for an external prefix corresponding to a device outside the local AS, and (ii) associates the external prefix, as a BGP next hop (B_NH), an abstract next hop (ANH) that identifies a set of BGP (eBGP) sessions that contains at least one eBGP session over which given external prefix has been learned, each of the at least one eBGP sessions being between the ASBR and a BGP peer device in an AS outside the AS, wherein the device located outside the local AS is reachable via the BGP peer device.

20 Claims, 20 Drawing Sheets

Related U.S. Application Data

(60) Provisional application No. 62/797,929, filed on Jan. 28, 2019.

(51) Int. Cl.
*H04L 45/50* (2022.01)
*H04L 12/66* (2006.01)
*H04L 45/748* (2022.01)
*H04L 45/00* (2022.01)

(56) References Cited

U.S. PATENT DOCUMENTS

| | | | |
|---|---|---|---|
| 10,015,073 B2 * | 7/2018 | Patel | H04L 45/48 |
| 10,097,449 B2 * | 10/2018 | Patel | H04L 45/12 |
| 2003/0142682 A1 * | 7/2003 | Bressoud | H04L 45/04 370/354 |
| 2016/0248663 A1 * | 8/2016 | Patel | H04L 45/24 |

* cited by examiner

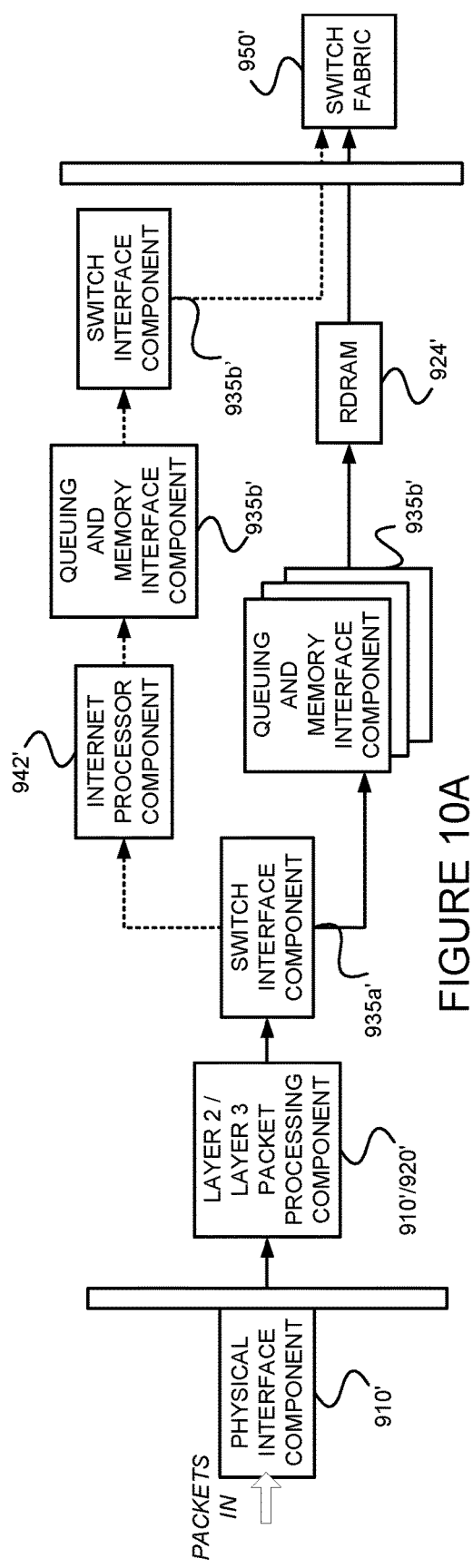
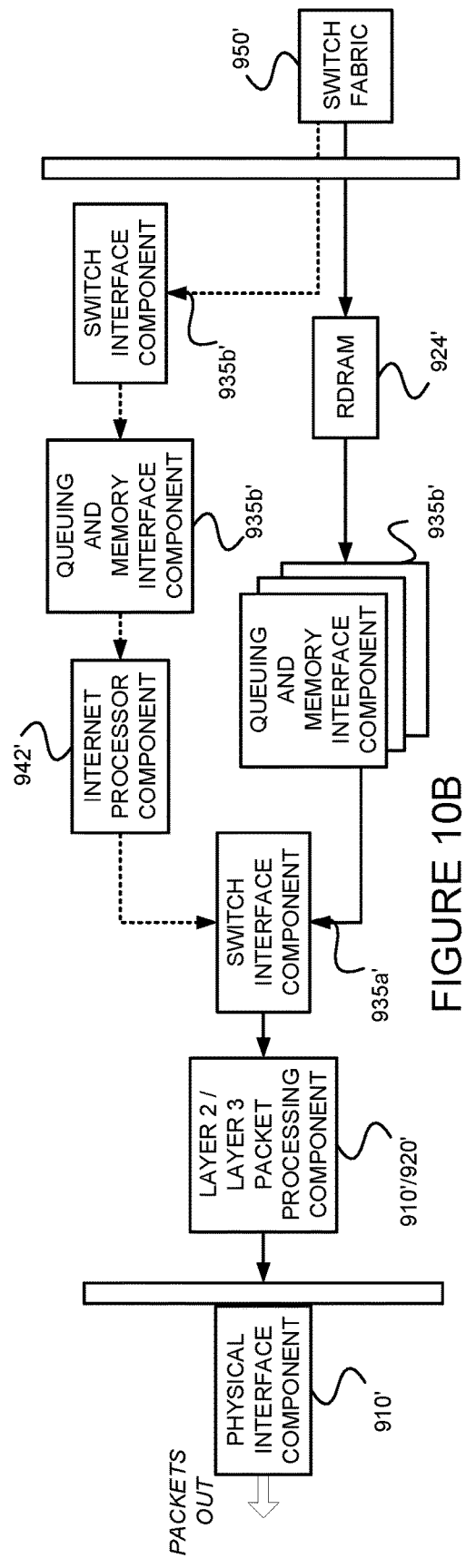
FIGURE 10A
FIGURE 10B

MINIMIZING OR REDUCING TRAFFIC LOSS WHEN AN EXTERNAL BORDER GATEWAY PROTOCOL (EBGP) PEER GOES DOWN

§ 1. RELATED APPLICATION(S)

The present application is a continuation of U.S. patent application Ser. No. 16/289,514 (referred to as "the '514 application" and incorporated herein by reference), titled "MINIMIZING OR REDUCING TRAFFIC LOSS WHEN AN EXTERNAL BORDER GATEWAY PROTOCOL (eBGP) PEER GOES DOWN," filed on Feb. 28, 2019, and listing Rafal Jan Szarecki, Kaliraj Vairavakkalai and Natrajan Venkataraman as the inventors, the '514 application claiming the benefit to the filing date of U.S. Provisional Application No. 62/797,929 (referred to as "the '929 provisional" and incorporated herein by reference), filed on Jan. 28, 2019, titled "THE BORDER GATEWAY PROTOCOL (BGP) ABSTRACT NEXT HOP (ANH) AND ITS USE IN NETWORKS," and listing Rafal Jan Szarecki, Kaliraj Vairavakkalai and Natrajan Venkataraman as the inventors. The present application is not limited to any specific implementations or embodiments described in the '929 provisional or the '514 application.

§ 2. BACKGROUND OF THE INVENTION

§ 2.1 Field of the Invention

Example embodiments consistent with the present invention concern network communications. In particular, at least some such example embodiments concern improving the resiliency of protocols, such as the Border Gateway Protocol ("BGP") described in "A Border Gateway Protocol 4 (BGP-4)," *Request for Comments* 4271 (Internet Engineering Task Force, January 2006)(referred to as "RFC 4271 and incorporated herein by reference).

§ 2.2 Background Information

In network communications system, protocols are used by devices, such as routers for example, to exchange network information. Routers generally calculate routes used to forward data packets towards a destination. Some protocols, such as the Border Gateway Protocol ("BGP"), which is summarized in § 2.2.1 below, allow routers in different autonomous systems ("ASes") to exchange reachability information.

§ 2.2.1 the Border Gateway Protocol ("BGP")

The Border Gateway Protocol ("BGP") is an inter-Autonomous System routing protocol. The following refers to the version of BGP described in RFC 4271. The primary function of a BGP speaking system is to exchange network reachability information with other BGP systems. This network reachability information includes information on the list of Autonomous Systems (ASes) that reachability information traverses. This information is sufficient for constructing a graph of AS connectivity, from which routing loops may be pruned, and, at the AS level, some policy decisions may be enforced.

It is normally assumed that a BGP speaker advertises to its peers only those routes that it uses itself (in this context, a BGP speaker is said to "use" a BGP route if it is the most preferred BGP route and is used in forwarding).

Generally, routing information exchanged via BGP supports only the destination-based forwarding paradigm, which assumes that a router forwards a packet based solely on the destination address carried in the IP header of the packet. This, in turn, reflects the set of policy decisions that can (and cannot) be enforced using BGP.

BGP uses the transmission control protocol ("TCP") as its transport protocol. This eliminates the need to implement explicit update fragmentation, retransmission, acknowledgement, and sequencing. When a TCP connection is formed between two systems, they exchange messages to open and confirm the connection parameters. The initial data flow is the portion of the BGP routing table that is allowed by the export policy, called the "Adj-Ribs-Out."

Incremental updates are sent as the routing tables change. BGP does not require a periodic refresh of the routing table. To allow local policy changes to have the correct effect without resetting any BGP connections, a BGP speaker should either (a) retain the current version of the routes advertised to it by all of its peers for the duration of the connection, or (b) make use of the Route Refresh extension.

KEEPALIVE messages may be sent periodically to ensure that the connection is live. NOTIFICATION messages are sent in response to errors or special conditions. If a connection encounters an error condition, a NOTIFICATION message is sent, and the connection is closed.

A BGP peer in a different AS is referred to as an external peer, while a BGP peer in the same AS is referred to as an internal peer. Internal BGP and external BGP are commonly abbreviated as iBGP and eBGP, respectively. If a BGP session is established between two neighbor devices (i.e., two peers) in different autonomous systems, the session is external BGP (eBGP), and if the session is established between two neighbor devices in the same AS, the session is internal BGP (iBGP).

If a particular AS has multiple BGP speakers and is providing transit service for other ASes, then care must be taken to ensure a consistent view of routing within the AS. A consistent view of the interior routes of the AS is provided by the IGP used within the AS. In some cases, it is assumed that a consistent view of the routes exterior to the AS is provided by having all BGP speakers within the AS maintain interior BGP ("iBGP") with each other.

Many routing protocols have been designed to run within a single administrative domain. These are known collectively as "Interior Gateway Protocols" ("IGPs"). Typically, each link within an AS is assigned a particular "metric" value. The path between two nodes can then be assigned a "distance" or "cost", which is the sum of the metrics of all the links that belong to that path. An IGP typically selects the "shortest" (minimal distance, or lowest cost) path between any two nodes, perhaps subject to the constraint that if the IGP provides multiple "areas", it may prefer the shortest path within an area to a path that traverses more than one area. Typically, the administration of the network has some routing policy that can be approximated by selecting shortest paths in this way.

BGP, as distinguished from the IGPs, was designed to run over an arbitrarily large number of administrative domains ("autonomous systems" or "ASes") with limited coordination among the various administrations. Both iBGP and IGP typically run simultaneously on devices of a single AS and complement each other. The BGP speaker that imports network destination reachability from an eBGP session to iBGP sessions, sets the BGP Next Hop attribute in an iBGP update. The BGP NH attribute is an IP address. Other iBGP speakers within the AS, upon recipient of the above iBGP update, consult IGP for reachability of BGP NH and its cost. If BGP NH is unreachable, the entire iBGP update is invalid. Otherwise, the IGP cost of reaching BGP NH is considered during BGP best path selection.

§ 2.2.1.1 Example Environment

FIG. 1A illustrates an example environment 100 in which the present invention may be used. The example environment 100 includes multiple autonomous systems (ASes 110a, 110b, . . . 110c). The ASes 110a-110c include BGP routers 105a-105e. BGP routers within an AS generally run iBGP, while BGP routers peering with a BGP router in another AS generally run eBGP. As shown, BGP router 105b and 105c are peers (also referred to as "BGP speakers") in a BGP session (depicted as 120). During the BGP session 120, the BGP speakers 105b and 105c may exchange BGP update messages. Details of the BGP update message 190 are described in § 2.2.1.2 below.

§ 2.2.1.2 BGP "Update" Messages

In BGP, UPDATE messages are used to transfer routing information between BGP peers. The information in the UPDATE message can be used to construct a graph that describes the relationships of the various Autonomous Systems. More specifically, an UPDATE message is used to advertise feasible routes that share a common set of path attribute value(s) to a peer (or to withdraw multiple unfeasible routes from service). An UPDATE message MAY simultaneously advertise a feasible route and withdraw multiple unfeasible routes from service.

The UPDATE message 190 includes a fixed-size BGP header, and also includes the other fields, as shown in FIG. 1A. (Note some of the shown fields may not be present in every UPDATE message). Referring to FIG. 1, the "Withdrawn Routes Length" field 130 is a 2-octets unsigned integer that indicates the total length of the Withdrawn Routes field 140 in octets. Its value allows the length of the Network Layer Reachability Information ("NLRI") field 170 to be determined, as specified below. A value of 0 indicates that no routes are being withdrawn from service, and that the WITHDRAWN ROUTES field 140 is not present in this UPDATE message 190.

The "Withdrawn Routes" field 140 is a variable-length field that contains a list of IP address prefixes for the routes that are being withdrawn from service. Each IP address prefix is encoded as a 2-tuple 140' of the form <length, prefix>. The "Length" field 142 indicates the length in bits of the IP address prefix. A length of zero indicates a prefix that matches all IP addresses (with prefix, itself, of zero octets). The "Prefix" field 144 contains an IP address prefix, followed by the minimum number of trailing bits needed to make the end of the field fall on an octet boundary. Note that the value of trailing bits is irrelevant.

Still referring to FIG. 1, the "Total Path Attribute Length" field 150 is a 2-octet unsigned integer that indicates the total length of the Path Attributes field 160 in octets. Its value allows the length of the Network Layer Reachability Information ("NLRI") field 170 to be determined. A value of 0 indicates that neither the Network Layer Reachability Information field 170 nor the Path Attribute field 160 is present in this UPDATE message.

The "Path Attributes" field 160 is a variable-length sequence of path attributes that is present in every UPDATE message, except for an UPDATE message that carries only the withdrawn routes. Each path attribute is a triple <attribute type, attribute length, attribute value> of variable length. The "Attribute Type" is a two-octet field that consists of the Attribute Flags octet, followed by the Attribute Type Code octet.

Finally, the "Network Layer Reachability Information" field 170 is a variable length field that contains a list of Internet Protocol ("IP") address prefixes. The length, in octets, of the Network Layer Reachability Information is not encoded explicitly, but can be calculated as: UPDATE message Length—23—Total Path Attributes Length (Recall field 150.)—Withdrawn Routes Length (Recall field 130.) where UPDATE message Length is the value encoded in the fixed-size BGP header, Total Path Attribute Length, and Withdrawn Routes Length are the values encoded in the variable part of the UPDATE message, and 23 is a combined length of the fixed-size BGP header, the Total Path Attribute Length field, and the Withdrawn Routes Length field.

Reachability information is encoded as one or more 2-tuples of the form <length, prefix>170', whose fields are shown in FIG. 1 and described here. The "Length" field 172 indicates the length in bits of the IP address prefix. A length of zero indicates a prefix that matches all IP addresses (with prefix, itself, of zero octets). The "Prefix" field 174 contains an IP address prefix, followed by enough trailing bits to make the end of the field fall on an octet boundary. Note that the value of the trailing bits is irrelevant.

Referring to FIG. 1B, "Multiprotocol Extensions for BGP-4," *Request for Comments* 4760 (Internet Engineering Task Force, January 2007) (referred to as RFC 4760 and incorporated herein by reference) describes a way to use the path attribute(s) field 160 of a BGP update message 100 to carry routing information for multiple Network Layer protocols (such as, for example, IPv6, IPX, L3VPN, etc.) More specifically, RFC 4760 defines two new path attributes—(1) Mulitprotocol Reachable NLRI ("MP_Reach_NLRI") and (2) Multiprotocol Unreachable NLRI ("MP_Unreach_NLRI"). The first is used to carry the set of reachable destinations together with next hop information to be used for forwarding to these destinations, while the second is used to carry a set of unreachable destinations. Only MP_Reach_NLRI is discussed below.

Referring to FIG. 1B, the MP_Reach_NLRI "path attribute" 160' includes an address family identifier ("AFI") (2 octet) field 161, a subsequent address family identifier ("SAFI") (1 octet) field 162, a length of Next Hop Network Address (1 octet) field 163, a Network Address of Next Hop (variable) field 164, a Reserved (1 octet) field 165 and a Network Layer Reachability Information (variable) field 166. The AFI and SAFI fields 161 and 162, in combination, identify (1) a set of Network Layer protocols to which the address carried in the Next Hop field 164 must belong, (2) the way in which the address of the Next Hop is encoded, and (3) the semantics of the NLRI field 166. The Network Address of Next Hop field 164 contains the Network Address of the next router on the path to the destination system. The NLRI field 166 lists NLRI for feasible routes that are being advertised in the path attribute 160. That is, the next hop information carried in the MP_Reach_NLRI 160' path attribute defines the Network Layer address of the router that should be used as the next hope to the destination(s) listed in the MP_NLRI attribute in the BGP Update message.

An UPDATE message can advertise, at most, one set of path attributes (Recall field 160.), but multiple destinations, provided that the destinations share the same set of attribute value(s). All path attributes contained in a given UPDATE message apply to all destinations carried in the NLRI field 170 of the UPDATE message.

As should be apparent from the description of fields 130 and 140 above, an UPDATE message can list multiple routes that are to be withdrawn from service. Each such route is identified by its destination (expressed as an IP prefix), which unambiguously identifies the route in the context of the BGP speaker—BGP speaker connection to which it has been previously advertised.

An UPDATE message might advertise only routes that are to be withdrawn from service, in which case the message will not include path attributes 160 or Network Layer Reachability Information 170. Conversely, an UPDATE message might advertise only a feasible route, in which case the WITHDRAWN ROUTES field 140 need not be present. An UPDATE message should not include the same address prefix in the WITHDRAWN ROUTES field 140 and Network Layer Reachability Information field 170 or "NLRI" field in the MP_REACH_NLRI path attribute field 166.

§ 2.2.1.3 BGP Peering and Data Stores: The Conventional "RIB" Model

FIG. 2 is a diagram illustrating a conventional BGP RIB model in which a BGP speaker interacts with other BGP speakers (peers). (Recall, for example, that in FIG. 1, BGP routers 105b and 105c are peers (also referred to as "BGP speakers") in a BGP session (depicted as 120).) In FIG. 2, a BGP peer 210 has a session with one or more other BGP peers 250. The BGP peer 210 includes an input (for example, a control plane interface, not shown) for receiving, from at least one outside BGP speaker 250, incoming routing information 220. The received routing information is stored in Adj-RIBS-In storage 212. The information stored in Adj-RIBS-In storage 212 is used by a decision process 214 for selecting routes using the routing information. The decision process 214 generates "selected routes" as Loc-RIB information 216, which is used to construct forwarding database. The Loc-RIB information 216 that is to be advertised further to other BGP speakers is then stored in Adj-RIBS-Out storage 218. As shown by 230, at least some of the information in Adj-RIBS-Out storage is then provided to at least one outside BGP speaker peer device 250 in accordance with a route advertisement process.

Referring to communications 220 and 230, recall that BGP can communicate updated route information using the BGP UPDATE message.

More specifically, IETF RFC 4271 documents the current version of the BGP routing protocol. In it, the routing state of BGP is abstractly divided into three (3) related data stores (historically referred to as "information bases") that are created as part of executing the BGP pipeline. To reiterate, the Adj-RIBS-In 212 describes the set of routes learned from each (adjacent) BGP peer 250 for all destinations. The Loc-RIB 216 describes the result of the BGP decision process 216 (which may be thought of loosely as route selection) in choosing a best BGP route and other feasible (e.g., valid but not best) alternate routes. The Adj-RIBS-Out 218 describes the process of injecting the selected route from the Loc-RIB 216 (or possibly a foreign route from another protocol) and placing it for distribution to (adjacent) BGP peers 250 using the BGP protocol (Recall, e.g. the UPDATE messages 190/230.).

§ 2.2.1.4 Next Hop Unchanged, Next Hop Self, and Associated Problems

FIG. 3A is a simple example of a typical communications network providing Internet service. Devices (e.g., routers) PE1 310, PE2 320, PE3 330 and RR 340 belong to an autonomous system (AS) 305. Devices PE1 310, PE2 320 and PE3 330 are referred to as provider edge (PE) devices. Devices PE1 310 and PE2 320 are also referred to as border routers of the AS 305 (ASBRs). Devices PE1 310, PE2 320 and PE3 330 are considered to be iBGP peers. Device 340 is a BGP speaker functioning as a route reflector (RR). Devices peer 1 350, peer 2 360 and peer 3 370 belong to one or more other ASs. PE1 310 peers with peer 1 350 and peer 2 360 via eBGP. Similarly, PE2 320 peers with peer 2 370 via eBGP. RIB information stored by PE2, including a next hop to Pfx1 as 10.0.26.1, is shown. iBGP update route(s), including the route to pfx1 with BGP NH attribute set to ASBR PE2 loopback interface IP address (lo0), are also shown.

PE1 and PE2 re-advertise routes received from eBGP-peers with "nexthop-self (ASBR lo0)" towards iBGP-peers (PE3) (Note that lo0 is a so-called "loopback interface."), or with "nexthop-unchanged (best Peer interface)". Problems with each are explained below.

Referring now to FIG. 3B, assume that "nexthop-self" is used, and further assume that eBGP Peer 3 370 at PE2 320 goes down for some reason. As shown in the iBGP update, moving the "from-iBGP-core" traffic away from PE2 320 is a per-BGP-prefix (pfx1, as well as any other prefixes that were reachable via Peer 3 370, which may number in the 10,000s or even in the 100,000s in real-world networks) withdrawal operation (which is slow). Until PE2 320 withdraws the eBGP-received routes from RR 340 and/or PE3 330, because the loopback interface, ASBR PE2 lo0, is still reachable to RR 340 and/or PE3 330, the traffic destined for Pfx1 (as well as any other prefixes that were reachable via Peer 3 370) remains attracted towards PE2 320 even though it will be dropped. Consequently, although an alternate path to pfx1 exists via PE1 310, PE3 330 is unable to use it in order to move traffic away from PE2 320 and improve convergence until PE3 330 receives and processes the iBGP update withdrawing the route for Pfx1 (as well as any other prefixes that were reachable via Peer 3 370) through PE2 320.

FIG. 4A presents the same network as FIG. 3A, but in FIG. 4A, PE1 310 uses "nexthop-unchanged." RIB information stored by PE1, including the route to pfx1 with BGP NH attribute set to 20.0.10.1, is shown. iBGP update route(s), including adding the route pfx1→BGP NH set to 20.0.10.1 (unchanged), are also shown. Referring now to FIG. 4B, assume that Peer 1 350 goes down for some reason, but the interface stays in an UP operations state. Under this scenario, as shown in the iBGP update, moving the "from-iBGP-core" traffic away from PE1 310 (provided that path via Peer 3 370 is better than via Peer 2 360) is a per-service-prefix withdrawal operation (which is slow). Consequently, until PE1 310 updates the eBGP-received routes to RR 340 and PE3 330 with new BGP NH (20.0.20.3, Peer 2), because the to-Peer 1 interface is still reachable to PE3 330 and RR 340, the traffic is attracted towards PE1 310 and stays on a sub-optimal path via peer 2 360. Thus, although a best path to pfx1 380 exists via PE2 320, until PE3 330 learns of the updated route, PE3 330 is unable to use the path via PE2 320 to improve convergence.

In view of the foregoing problems encountered when using next-hop self and next-hop unchanged, it would be useful to improve convergence by removing dependency from the per-BGP-prefix withdrawal/update operations such as those described above. For example, it would be useful to minimize or reduce traffic loss when an external border gateway protocol (eBGP) peer (or eBGP session) goes down.

§ 3. SUMMARY OF THE INVENTION

An example router consistent with the present description, and configured as an autonomous system border router (ASBR) in a local autonomous system (AS), includes: (1) a control component for communicating and computing routing information, the control component running a Border Gateway Protocol (BGP) and peering with at least one BGP peer device in an outside autonomous system (AS) different from the local AS; and (2e wherein the control component (i) receives reachability information for an external prefix corresponding to a device outside the local AS, and (ii) associates the external prefix, as a BGP next hop (B_NH), an abstract next hop (ANH) that identifies a set of BGP (eBGP) sessions that contains at least one eBGP session over which given external prefix has been learned, each of the at least one eBGP sessions being between the ASBR and a BGP peer device in an AS outside the AS, wherein the device located outside the local AS is reachable via the BGP peer device.

In at least some such example routers, the ANH may be an IP address. The control component may further advertise the ANH using an Interior Gateway Protocol (IGP) of the local AS, or may further advertise the ANH via a Multiprotocol Label Switching (MPLS) label distribution control protocol of the local AS.

In at least some such example routers, the ANH identifies a set of BGP sessions between the router and peer devices in the outside AS through which the device is reachable.

In at least some such example routers, the ANH identifies a set of BGP sessions between the router and at least one peer device in the outside AS and BGP sessions between at least one other ASBR router in the local AS and at least one peer device in the outside AS through which the device is reachable.

In at least some such example routers, the ANH identifies a set of BGP sessions between the router and peer devices in at least two ASes outside the local AS through which the device is reachable.

In at least some such example routers, the ANH identifies a set of BGP sessions between the router and at least one peer device in an AS outside the local AS, and BGP sessions between at least one other ASBR router in the local AS and at least one peer device in an AS outside the local AS through which the device is reachable.

In at least some such example routers, the control component further advertises to a route reflector (RR) within the local AS, the external prefix with the abstract next hop as a single path, regardless of how many eBGP sessions are associated with the ANH and regardless of whether or not the external prefix was learned from more than one of the eBGP sessions.

In at least some such example routers, the control component further advertises the external prefix with the abstract next hop as a single path, regardless of how many eBGP sessions are associated with the ANH and regardless of whether or not the external prefix was learned from more than one of the eBGP sessions.

In at least some such example routers, responsive to determining a failure of at least one of the at least one BGP sessions associated with same given ANH, the control component (i) determines if any other of the at least one BGP sessions associated with the ANH is active, and (ii) responsive to a determination that no other of the at least one BGP sessions associated with the ANH is active, sends a IGP update message withdrawing the ANH IP address in the local AS, and otherwise, responsive to a determination that at least one other of the at least one BGP sessions associated with the ANH is active, maintains the ANH reachability in IGP.

§ 4. BRIEF DESCRIPTION OF THE DRAWINGS

FIGS. 10A and 10B illustrate example packet forwarding operations of the example distributed ASICs of FIG. 9.

Figure 14A:
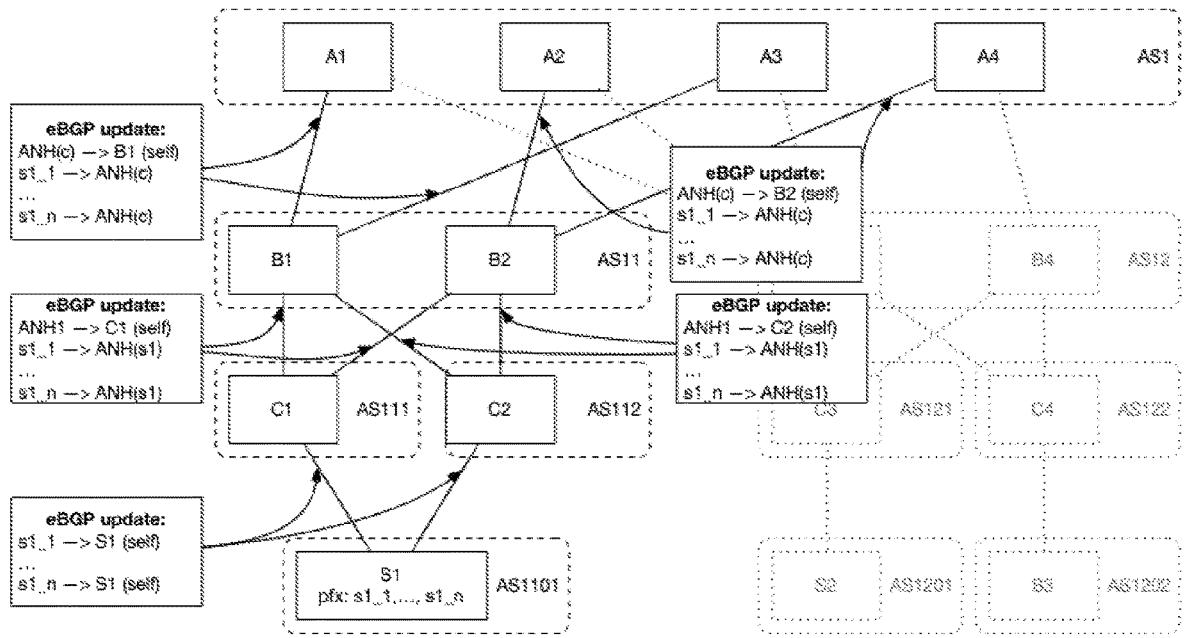
Figure 14B:
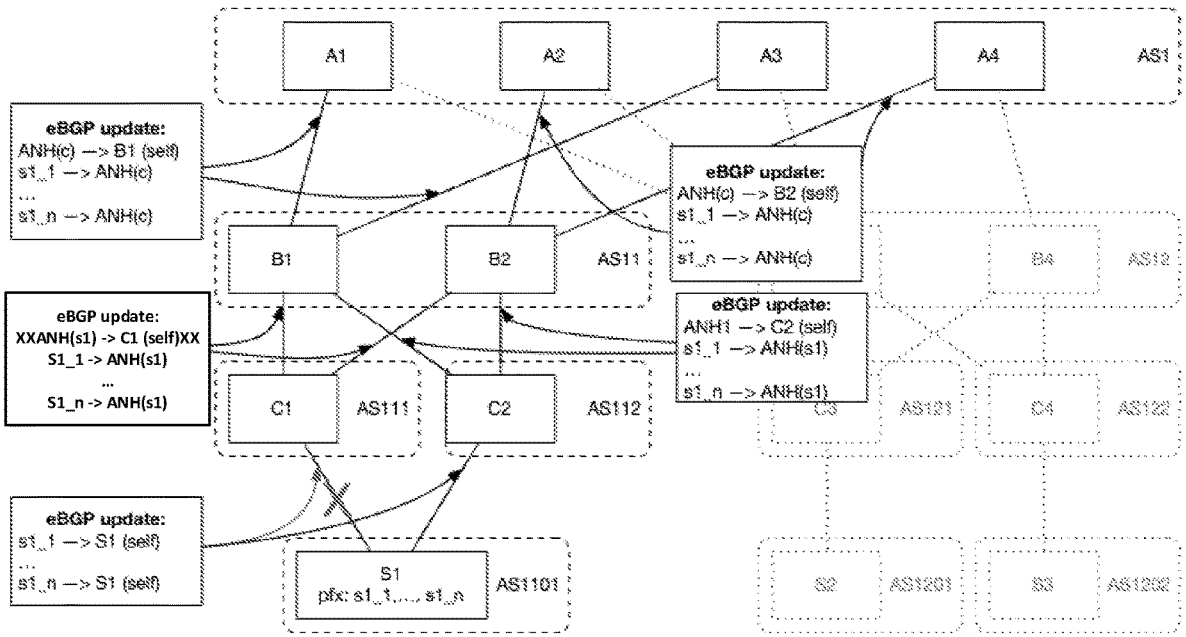

FIGS. 14A and 14B illustrate an example IP CLOS data center fabric network in which an ANH for one or more eBGP learned prefixes may be used in a manner consistent with the present description. (See, e.g., "Use of BGP for Routing in Large-Scale Data Centers," *Request for Comments* 7938 (*Internet Engineering Task Force, August* 2016), referred to as "RFC 7938" and incorporated herein by reference.)

§ 5. DETAILED DESCRIPTION

The present description may involve novel methods, apparatus, message formats, and/or data structures for improving convergence by removing dependency on per-BGP-prefix withdrawal operations in response to a lost connection with an eBGP peer (e.g., by minimizing or reducing traffic loss when an external border gateway protocol (eBGP) peer (or an eBGP session) goes down). The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

Figure 3A:
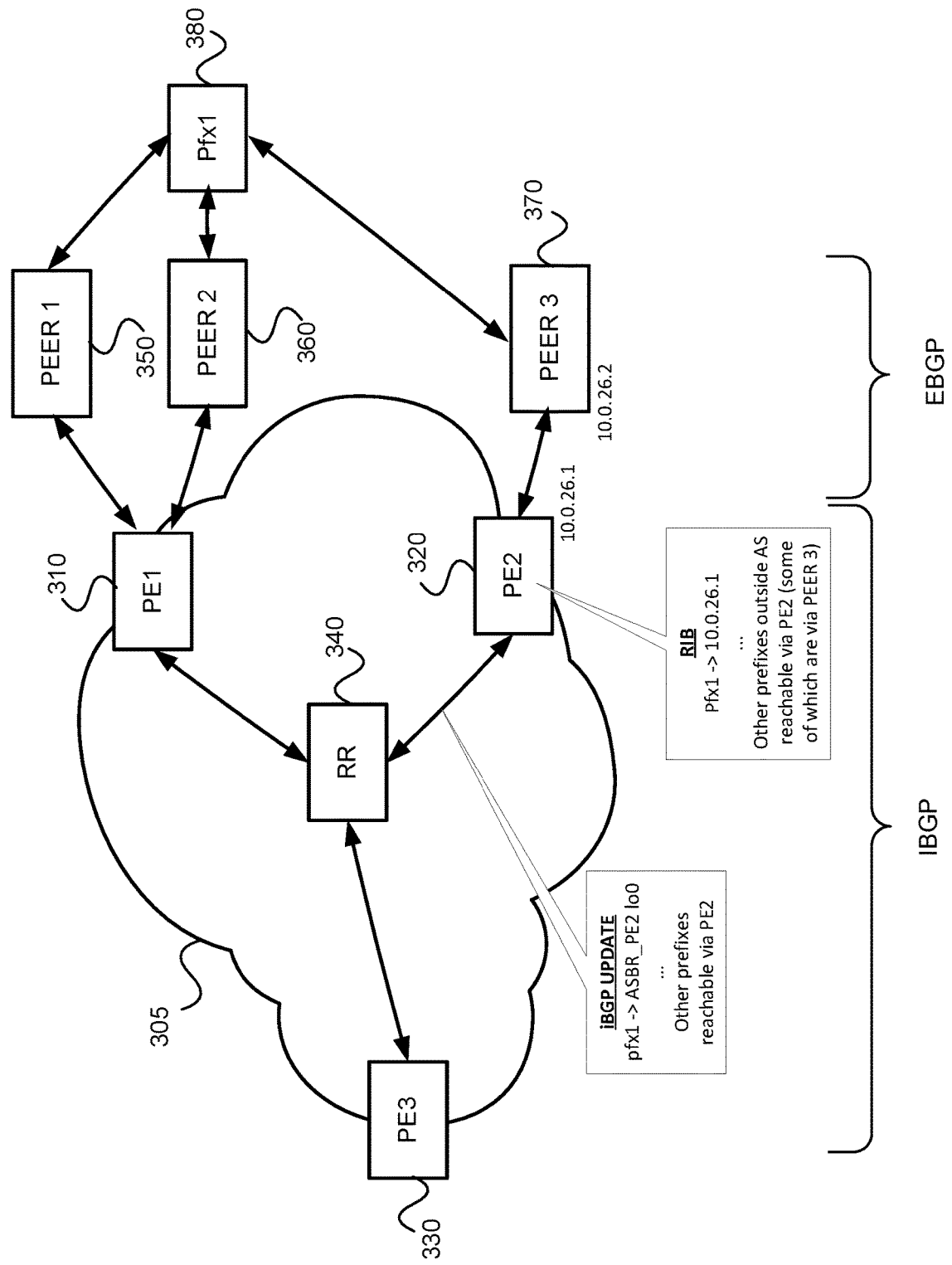
FIGS. 3A and 3B illustrate disadvantages of using next-hop self for eBGP learned prefixes in an example network environment.
Figure 3B:
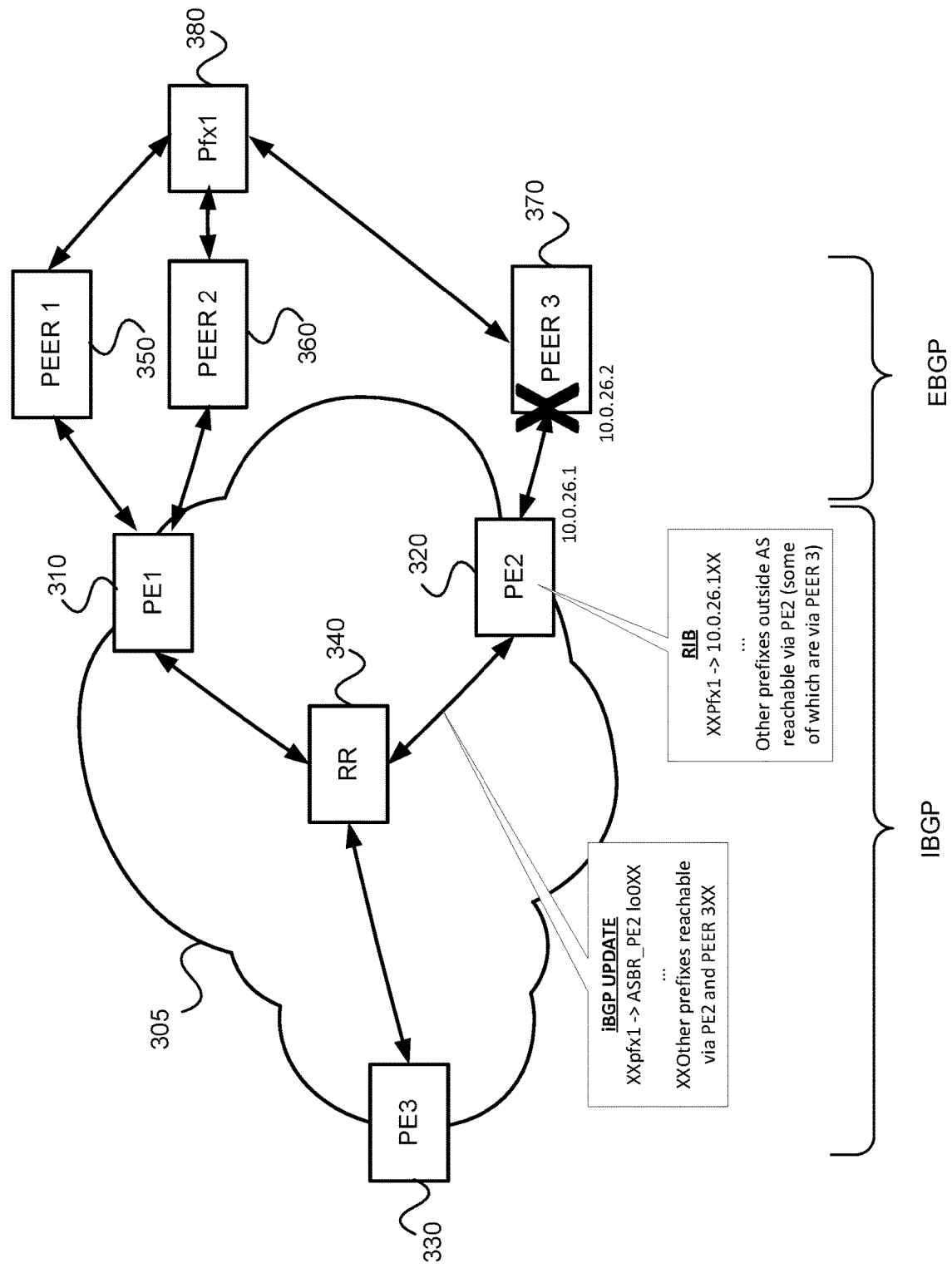
Figure 4A:
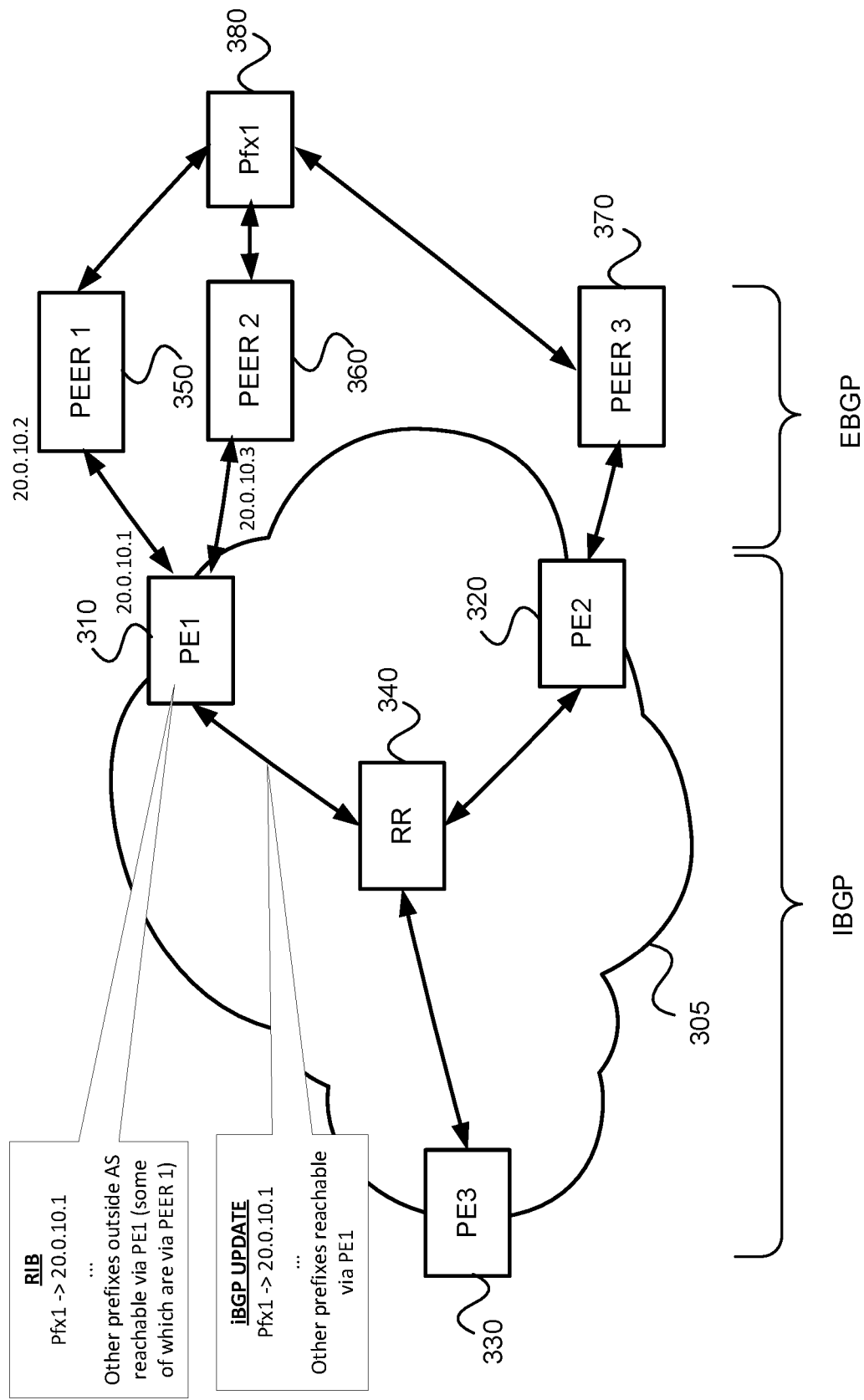
FIGS. 4A and 4B illustrate disadvantages of using next-hop unchanged for eBGP learned prefixes in an example network environment.
Figure 4B:
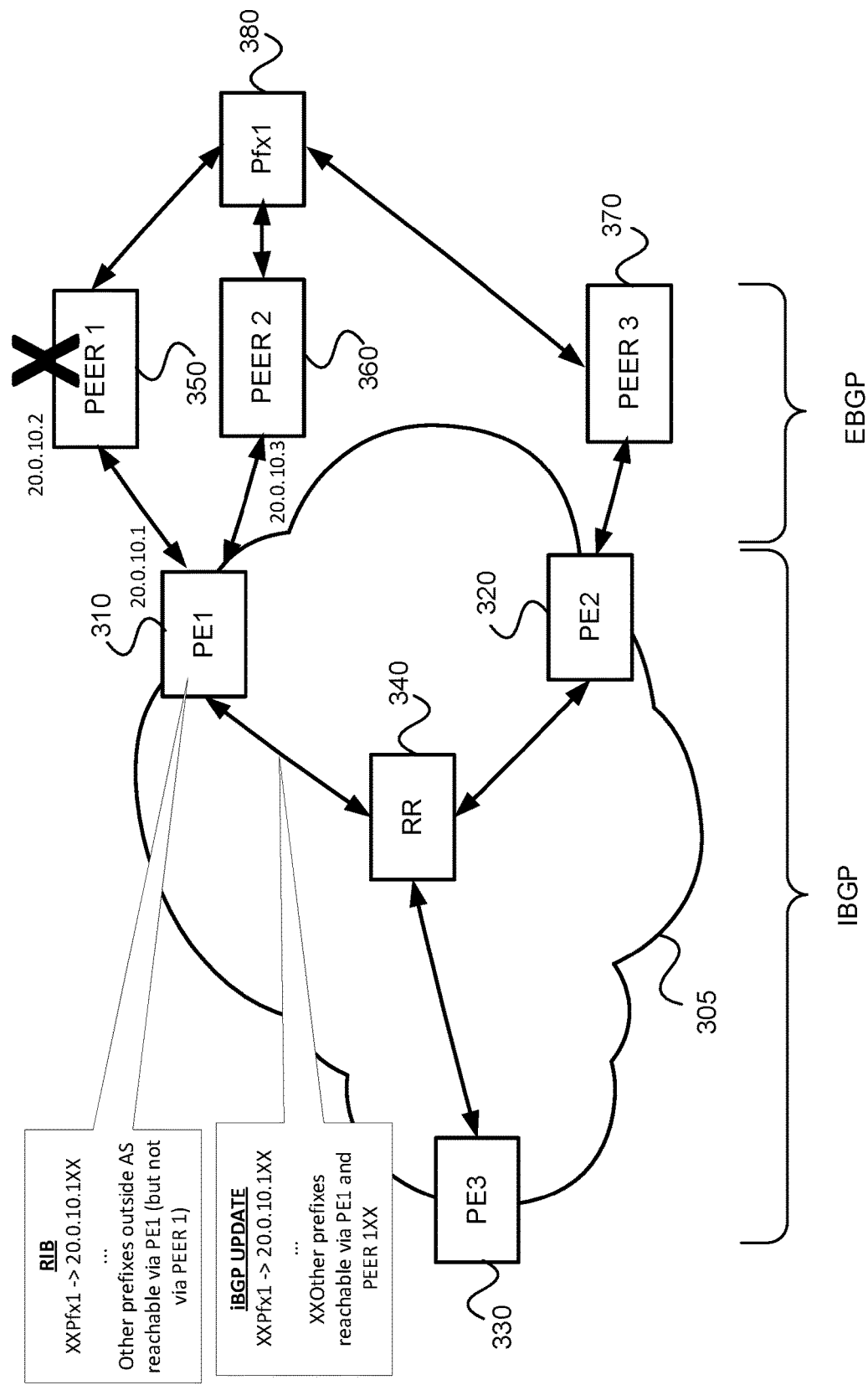

Example embodiments consistent with the present description provide a so-called Abstract Next Hop (or ANH). Referring back to FIGS. 3A and 3B, instead of using "nexthop-self(ASBR lo0)", the ASBRs use nexthop-self (ANH-address). When a BGP speaker advertises a path to its iBGP peer, it modifies the Protocol Next-Hop to be the ANH value. The ANH is just an IP address that identifies the eBGP session or a set of eBGP sessions.

ANH may simply be an IP-address that identifies an eBGP peer or a set of eBGP peers. The set of eBGP peers may be defined by a human operator via a user interface of the ASBR, or remotely. Thus, the set of eBGP sessions may be defined by a human operator in local configuration, according to network design needs. As one example, the set of eBGP peers may be defined as those eBGP peers belonging to same peer AS and handled by given single ASBR. As another example, a set of eBGP peers may be defined as those eBGP peers belonging to same peer AS and handled by one or more ASBR(s) at given site. As yet another example, a set of eBGP peers may be defined as eBGP peers belonging to any of upstream provider AS. As yet still another example, a set of eBGP peers may be defined as BGP sessions with a given peer device and handled by one or more of ASBRs of the local AS. Naturally other sets or groupings of eBGP peers are possible.

A host route to the ANH is installed in the relevant RIB and redistributed into the IGP. BGP maintains the ANH host route based on the state of the associated group of BGP sessions as follows. As soon as all BGP sessions in the set go "DOWN," the ANH route is removed. When at least one BGP session of the set comes "UP," the ANH route is created only after initial route convergence is complete for the peer (e.g., when an End-of-RIB (EoR) (See, e.g., "Graceful Restart Mechanism for BGP," *Request for Comments* 4724 (Internet Engineering Task Force, January 2007) (referred to as "RFC 4724" and incorporated herein by reference) is received). Taken together, these procedures ensure that as soon as the final eBGP session in the set goes DOWN, ingress routers will see the associated ANH withdrawn from the IGP. Since the ANH is used to resolve the BGP next hops of BGP prefixes, the ingress routers are triggered to converge to send traffic to their alternate (new best) route. They also ensure that as soon as one session in the set comes UP and is synchronized (that is, the EoR is received), ingress routers will see the ANH advertised in the IGP and will be able to re-converge to use routes that are associated with that next hop.

By way of background, RFC 4724 recognized that usually, when BGP on a router restarts, all the BGP peers detect that the session went "DOWN" and then came "UP." This down-to-up transition results in a "routing flap" and causes BGP route re-computation, generation of BGP routing updates, and unnecessary churn to the forwarding tables (which could spread across multiple routing domains). Such routing flaps may create undesirable transient forwarding blackholes and/or transient forwarding loops. They also consume resources on the control plane of the routers affected by the flap. As such, they are detrimental to the overall network performance. RFC 4724 describes a mechanism to help minimize the negative effects caused by BGP restart. More specifically, per RFC 4724, an End-of-RIB marker is specified and can be used to convey routing convergence information. RFC 4724 defines a new BGP capability, termed "Graceful Restart Capability", that would allow a BGP speaker to express its ability to preserve forwarding state during BGP restart. Finally, RFC 4724 outlines procedures for temporarily retaining routing information across a TCP session termination/re-establishment. A BGP UPDATE message with no reachable Network Layer Reachability Information (NLRI) and empty withdrawn NLRI is specified as the "End-of-RIB marker" that can be used by a BGP speaker to indicate to its peer the completion of the initial routing update after the session is established. For the IPv4 unicast address family, the End-of-RIB marker is an UPDATE message with the minimum length (See, e.g., RFC 4271). For any other address family, it is an UPDATE message that contains only the MP_UNREACH_NLRI attribute (See, e.g., RFC 4760.) with no withdrawn routes for that <AFI, SAFI>. Although the End-of-RIB marker is specified for the purpose of BGP graceful restart, it is noted that the generation of such a marker upon completion of the initial update would be useful for routing convergence in general. In addition, it would be beneficial for routing convergence if a BGP speaker can indicate up-front to its peer that it will generate the End-of-RIB marker (regardless of its ability to preserve its forwarding state during BGP restart).

A host route to ANH (/32 for IPv4 or /128 for IPv6) is installed in an IP Route Information Base (IP RIB, such as inet.0 or inet6.0 in routers from Juniper Networks, Inc. of Sunnyvale, Calif.) or in a Labeled IP RIB (such as inet.3 and inet6.3 in routers from Juniper Networks) and redistributed into IGP/LDP (Transport-protocols). In the Junos OS from Juniper Networks, the routing table "inet.0" and "inet6.0" are used for IP version 4 (IPv4) and IP version 6 (IPv6) unicast routes, respectively, and used to construct forwarding stricture—FIB (Forwarding Information Base). This table stores interface local and direct routes, static routes, and dynamically learned routes. In the Junos OS from Juniper Networks, the Labeled IP RIB routing table are "inet.3" and "inet6.3," used for IPv4 MPLS and IPv6 MPLS, respectively. This table stores the MPLS FEC, typically egress address of an MPLS label-switched path (LSP), the LSP name, and the outgoing interface name. This routing table is used only when the local device is the ingress node to an LSP for the purpose of Next Hop resolution. The IGPs and BGP store their routing information in the inet.0/inet6.0 routing table, the main IP routing table. To do so, for BGP routes, the BGP NH needs to be resolved. If the traffic-engineering BGP is enabled (Implicit default on Junos OS from Juniper Networks, Inc. of Sunnyvale, Calif.), thereby allowing only BGP to use MPLS paths for forwarding traffic, BGP can access the inet.3 routing table. BGP uses both inet.0 and inet.3 to resolve next-hop addresses. If the traffic-engineering BGP-IGP command is configured, thereby allowing the IGPs to use MPLS paths for forwarding traffic, MPLS path information is stored in the inet.0 routing table. The inet.3 routing table contains the MPLS FEC addresses, typically host address of each LSP's egress router. BGP uses the inet.3 routing table on the ingress router to help in resolving next-hop addresses. When BGP resolves a BGP next-hop attribute of given prefix, it examines both the inet.0 and inet.3 routing tables, seeking the next hop with the best match (longest prefix match) and of best preference. If it finds a next-hop entry with an equal preference in both routing tables, BGP prefers the entry in the inet.3 routing table.)

An ANH IP address can be any value that user wants to assign based on IP-address management. As one example, ANHx can be PeerX's lo0-address, when ANH is to represent a single eBGP peer device connected to local AS.

The IGP route to ANH/32 or ANH/128 route can be withdrawn or advertised with a less preferred metric to drain traffic away from the eBGP-peer(s).

§ 5.1 Example Methods

Figure 5:
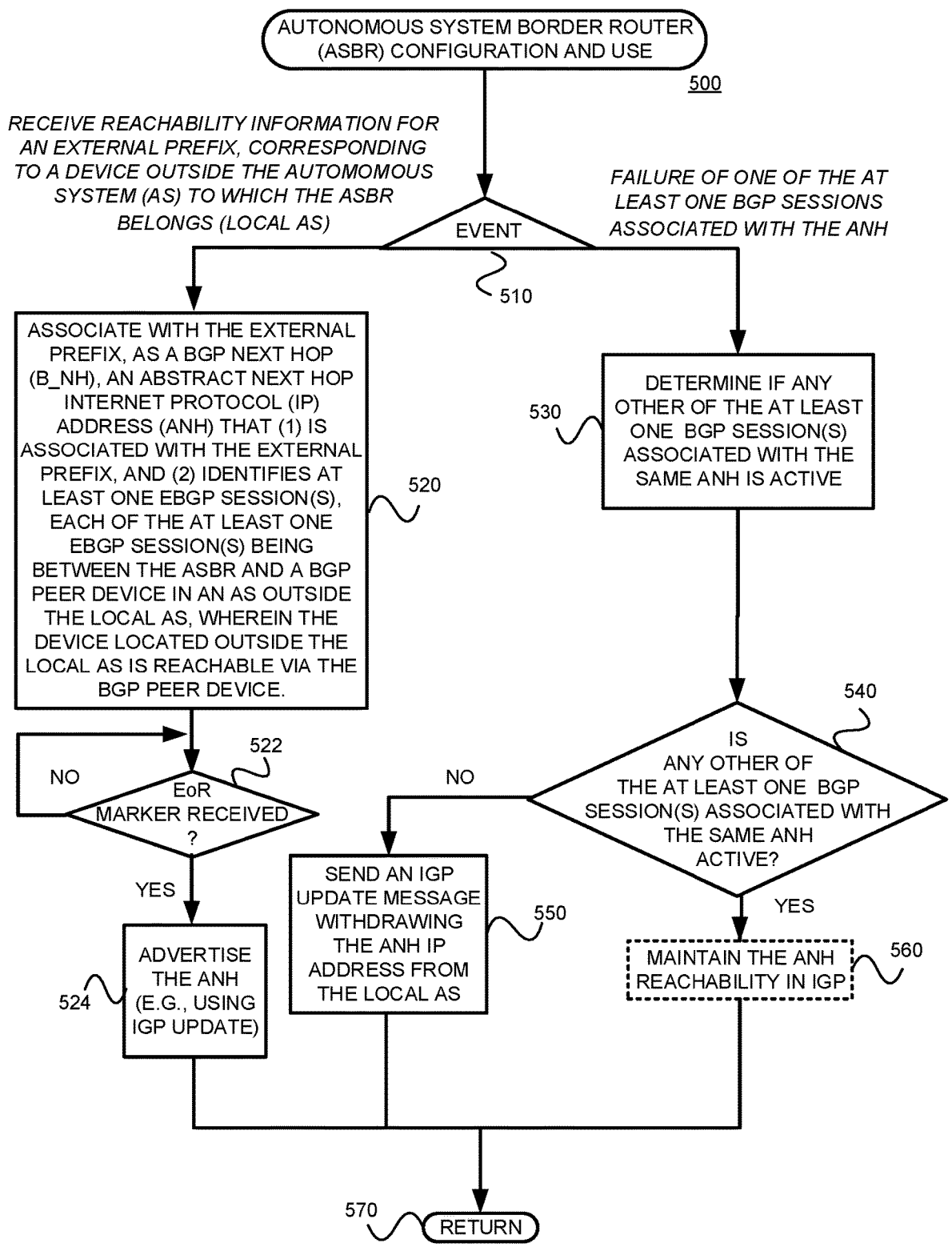
FIG. 5 is a flow diagram of an example method for configuring (and using) an autonomous system border router (ASBR) in a manner consistent with the present description.

FIG. 5 is a flow diagram of an example method 500, consistent with the present description, for configuring (and using) an autonomous system border router (ASBR) in a local autonomous system (AS) having at least one BGP peer device in an outside autonomous system (AS) different from the local AS. Different branches of the example method 500 are performed in response to the occurrence of different events. (Event branch point 510) More specifically, responsive to the receipt of reachability information for an external prefix, corresponding to a device outside the local AS, the received external prefix is associated with, as a BGP next hop (B_NH), an abstract next hop Internet protocol (IP) address (ANH) that (1) is associated with the external prefix, and (2) identifies at least one eBGP session(s), each of which at least one eBGP session(s) being between the ASBR and a BGP peer device in an AS outside the local AS, wherein the device located outside the local AS is reachable via the BGP peer device. (Block 520) The example method 500 then waits for the EoR marker. (Decision 522, NO) Once the EoR marker is received (Decision 522, YES), the ANH is advertised (e.g., using IGP update)(Block 524), before the example method 500 is left (Node 570). The event on the left of event block 510 and the act of block 520 may be the result of manually entered (e.g., via a user interface) configuration information, and/or configuration information provided from an external source (e.g., provided on a non-transitory computer readable medium, and/or communicated). In example embodiments consistent with the present description, the ANH does not identify, and is not associated with, any other object than the at least BGP sessions with which it is associated.

Still referring to FIG. 5, the configured external prefix and ANH information may be used as follows. Referring back to event branch point 510, responsive to determining the failure of one of the at least one BGP sessions associated with the ANH, the example method 500 may determine if any other of the at least one BGP session(s) associated with the same ANH is active. (Block 530) Responsive to a determination that no other of the at least one BGP session(s) associated with the same ANH is active (Decision 540, NO), the example method 500 may send an IGP (e.g., Open Shortest Path First (OSPF), Intermediate System-Intermediate System (IS-IS)) update message withdrawing the ANH IP address from the local AS (Block 550) before the example method 500 is left (Node 570). (This allows the ingress-PE to use this one-event—namely the ANH withdrawal—to invalidate all external prefixes advertised with the ANH-UP as next hop, thereby providing faster convergence than per-prefix withdrawal.) If, on the other hand, it is determined that at least one other of the at least one BGP sessions associated with the ANH is active (Decision 540, YES), the example method 500 maintains the ANH reachability in IGP (Block 560) before the example method 500 is left (Node 570). Referring to block 560, maintaining the ANH reachability in IGP (e.g., iBGP) might not require any affirmative act.

§ 5.2 Illustrative Example of Operations of Example Embodiment

Figure 6A:
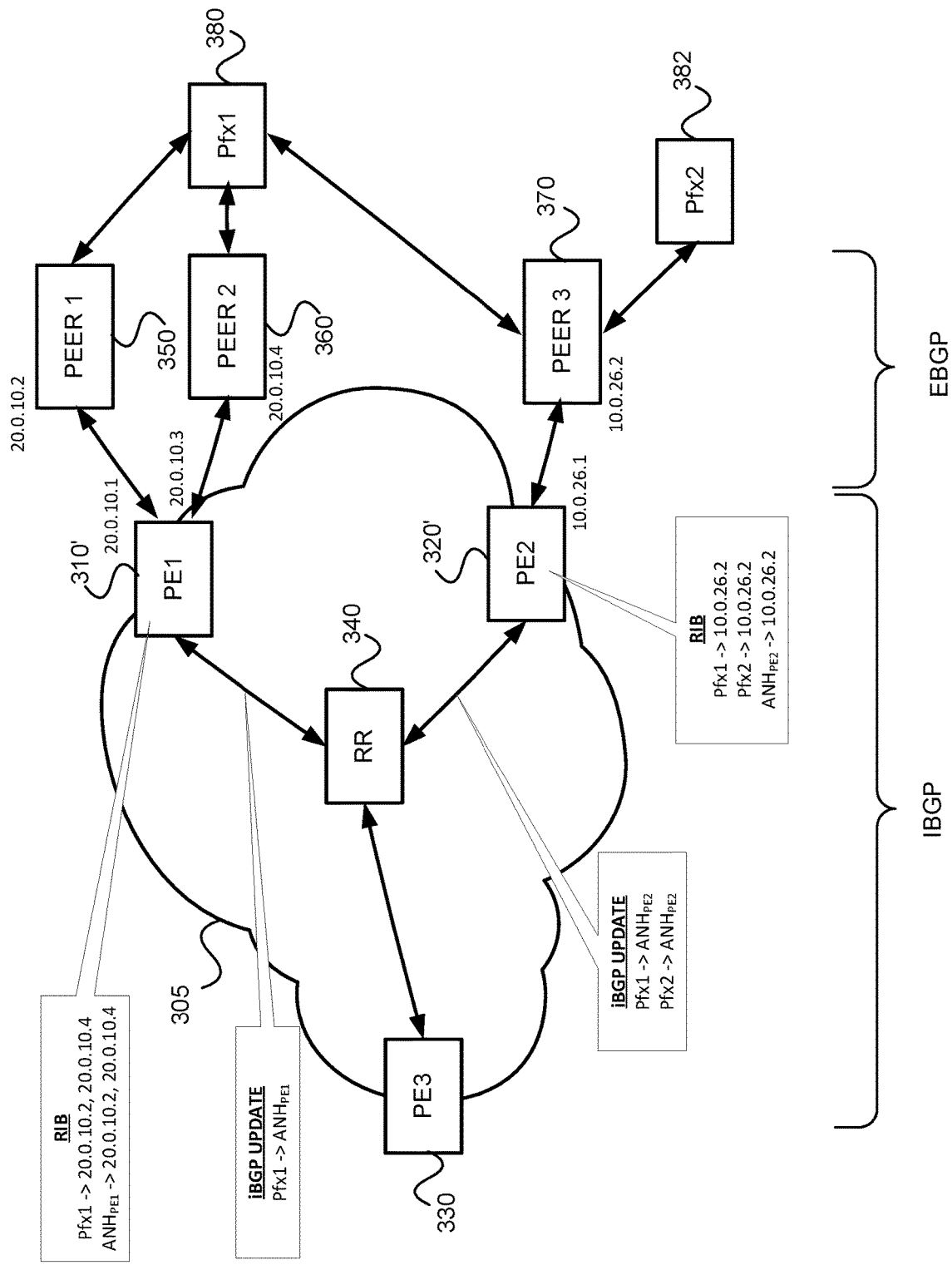
FIGS. 6A-6C illustrates advantages of using an abstract next hop (ANH) for one or more eBGP learned prefixes in a manner consistent with the present description, especially when compared with using next-hop self or next-hop unchanged, in an example network environment.
Figure 6B:
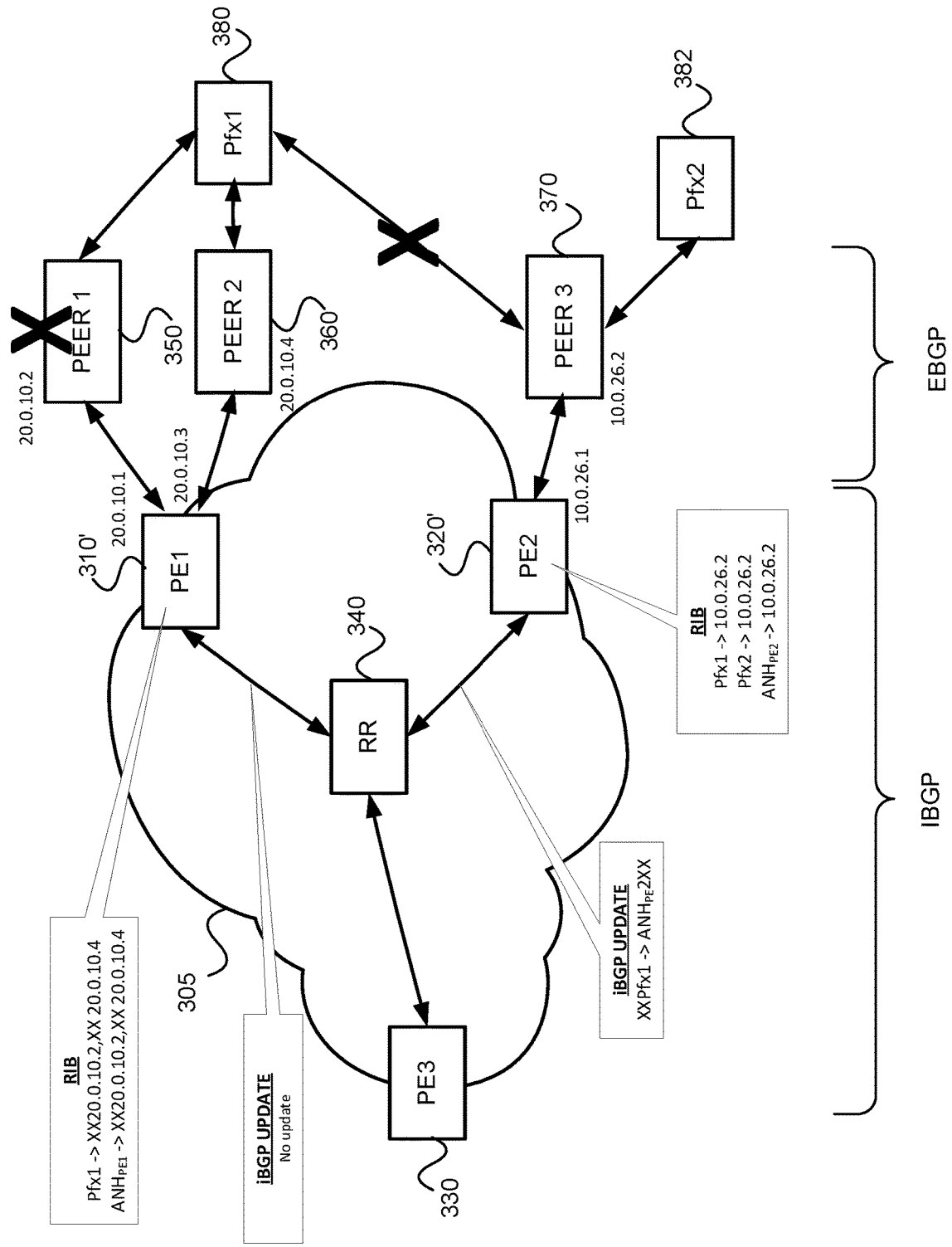
Figure 6C:
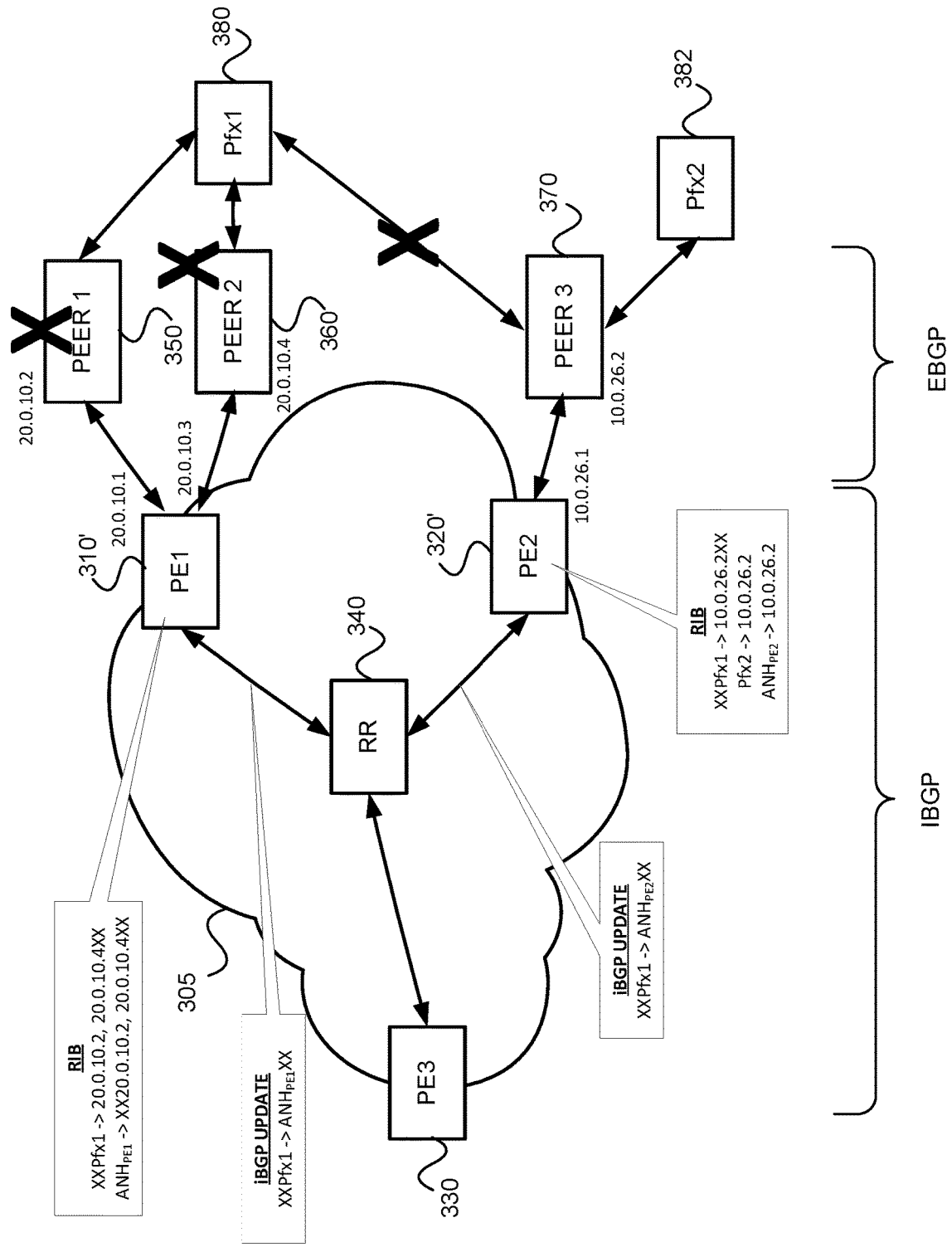

FIGS. 6A-6C illustrates advantages of using an abstract next hop (ANH) for one or more eBGP-learned prefixes in a manner consistent with the present description, especially when compared with using next-hop self or next-hop unchanged, in an example network environment 600. Note that the example network environment 600 is similar to the network environment 300 of FIGS. 3A-4B, but includes a device 382 with prefix Pfx2 linked with Peer 3 370. Otherwise, the reference numbers used in FIGS. 6A-6C are the same as those used in FIGS. 3A-4B and explanation of common elements is not repeated.

Referring first to FIG. 6A, note that the RIB of PE1 310' associates an abstract next hop ($ANH_{PE1}$) with the prefix Pfx1. Furthermore, RIB of PE1 310' associates $ANH_{PE1}$ with remote-end IP address of both of the eBGP sessions; 20.0.10.2 for PEER 1 350 and 20.0.10.4 for PEER 2 360. However, as shown, the iBGP update message advertising prefix Pfx1 includes only the association of Pfx1 with $ANH_{PE1}$.

Further note that the BGP RIB of PE2 320' associates an abstract next hop ($ANH_{PE2}$) with the both the prefix Pfx1 and the prefix Pfx2, as shown. $ANH_{PE2}$ is associated with the IP address of remote-end of the eBGP session with Peer 3 370 (10.0.26.2) in PE2's RIB. As shown, the iBGP update message advertising the prefixes includes the association of Pfx1 with $ANH_{PE2}$ and the association of Pfx2 with $ANH_{PE2}$.

Referring next to FIG. 6B, assume that peer 1 350 goes down, and that the eBGP session between Peer 3 370 and Pfx1 380 goes down (as indicated by the large X's). Since eBGP session with Peer 1 310' is down, the association of $ANH_{PE1}$ with Peer 1 310' address (20.0.10.2) is removed from its RIB as indicated by prepended and appended "XX"s. However, since there is another BGP session associated with $ANH_{PE1}$ that is still active, no iBGP update is necessary. (Recall, e.g., 540 and 560 of FIG. 5.) In this way, routers RR 340 and PE3 330 will know that Pfx1 remains reachable via PE1 310'.

Still referring to FIG. 6B, since PE2 320' can no longer reach Pfx1, but can still reach Pfx2, the association of the $ANH_{PE2}$ with Pfx1 is removed from its RIB as indicated by prepended and appended "XX"s. This path is also withdrawn via an iBGP update (which is no worse than the per-BGP-prefix withdrawal process discussed above with reference to FIGS. 3B and 4B), as indicated by prepended and appended "XX"s. In this way, routers RR 340 and PE3

330 will know that Pfx1 is not reachable via PE2 320', but that Pfx2 remains reachable via PE2 320'.

Finally, referring to FIG. 6C, assume that Peer 2 360 also goes down (as indicated by the additional large X). Since PE1's 310' eBGP session with Peer 2 360 is down, Pfx1 can no longer be reached via Peer 2 360. Consequently, the association of $ANH_{PE1}$ with PEER 2 address (20.0.10.4) in its RIB is removed, as indicated by the further prepended and appended "XX"s. Furthermore, since there is no other BGP session associated with $ANH_{PE1}$ that is still active, (1) an IGP update is sent to remove the route to $ANH_{PE1}$ and (2) an iBGP update is sent to withdraw the path Pfx1→$ANH_{PE1}$. (Recall, e.g., 540 and 550 of FIG. 5.) In this way, when routers RR 340 and PE3 330 receive an IGP update and remove the ANH route, these routers will know that Pfx1 is now unreachable via PE1 310'. Importantly, note that a single ANH route withdrawn from IGP effectively withdraws all paths associated with any prefix like Pfx1 that shared same BGP NH attribute of $ANH_{PE1}$ value. (As noted above, although only two paths were associated with Pfx1 were reachable via PE1 in this simple example, the $ANH_{PE1}$ may cover any other prefixes that were reachable via PE1 310' and Peer 1 350 or Peer 2 360, which may number in the 10,000s or even in the 100,000s in real-world networks.) This permits faster convergence than the per-prefix withdraws of previous methods.

Still referring to FIG. 6C, the iBGP update ensures that ingress-router PE3 330 will see an BGP protocol next-hop unreachablity event for $ANH_{PE1}$ as soon as PE1's 310' eBGP sessions with both peer 1 350 and peer 2 360 went down. Since slow per-prefix withdrawals are not necessary, PE3 330 can converge to send traffic to an alternate/best next hop to reach Pfx1 (e.g., via PE2 320 if it was assumed that the link between peer 3 370 and Pfx1 380 is up).

§ 5.3 Example Apparatus

Figure 7:
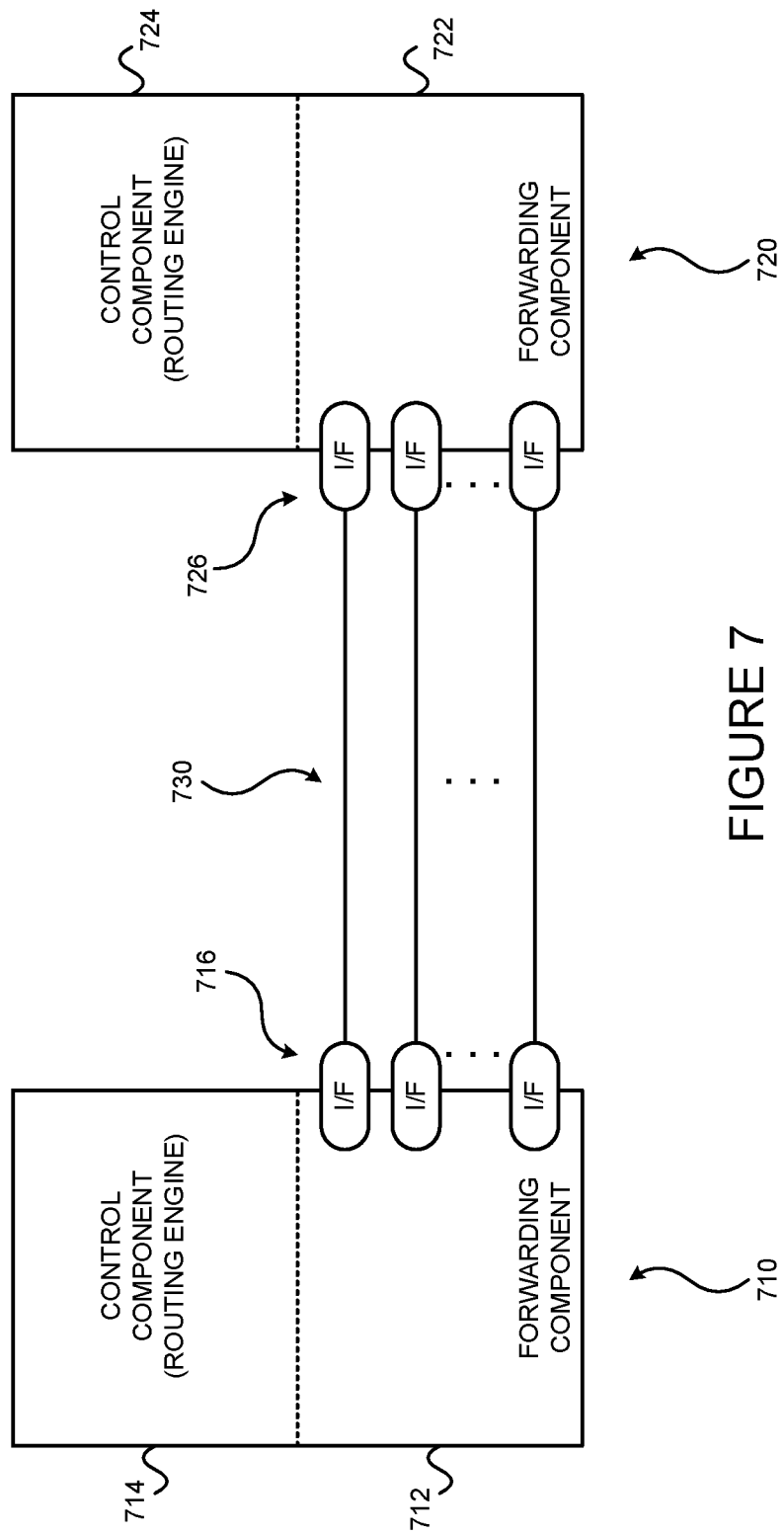
FIG. 7 illustrates an example environment including two systems coupled via communications links.

FIG. 7 illustrates two data forwarding systems 710 and 720 coupled via communications links 730. The links may be physical links or "wireless" links. The data forwarding systems 710,720 may be nodes, such as routers for example. If the data forwarding systems 710,720 are example routers, each may include a control component (e.g., a routing engine) 714,724 and a forwarding component 712,722. Each data forwarding system 710,720 includes one or more interfaces 716,726 that terminate one or more communications links 730. The example method 500 described above may be implemented in the control component 714/724 of devices 710/720.

As just discussed above, and referring to FIG. 8, some example routers 800 include a control component (e.g., routing engine) 810 and a packet forwarding component (e.g., a packet forwarding engine) 890.

The control component 810 may include an operating system (OS) kernel 820, routing protocol process(es) 830, label-based forwarding protocol process(es) 840, interface process(es) 850, configuration API(s) 852, a user interface (e.g., command line interface) process(es) 854, programmatic API(s), 856, and chassis process(es) 870, and may store routing table(s) 839, label forwarding information 845, configuration information in a configuration database(s) 860 and forwarding (e.g., route-based and/or label-based) table(s) 880. As shown, the routing protocol process(es) 830 may support routing protocols such as the routing information protocol ("RIP") 831, the intermediate system-to-intermediate system protocol ("ISIS") 832, the open shortest path first protocol ("OSPF") 833, the enhanced interior gateway routing protocol ("EIGRP") 834 and the border gateway protocol ("BGP") 835, and the label-based forwarding protocol process(es) 840 may support protocols such as BGP 835, the label distribution protocol ("LDP") 836 and the resource reservation protocol ("RSVP") 837. One or more components (not shown) may permit a user to interact, directly or indirectly (via an external device), with the router configuration database(s) 860 and control behavior of router protocol process(es) 830, the label-based forwarding protocol process(es) 840, the interface process(es) 850, and the chassis process(es) 870. For example, the configuration database(s) 860 may be accessed via SNMP 885, configuration API(s) (e.g. the Network Configuration Protocol (NetConf), the Yet Another Next Generation (e) protocol, etc.) 852, a user command line interface (CLI) 854, and/or programmatic API(s) 856. Control component processes may send information to an outside device via SNMP 885, syslog, streaming telemetry (e.g., Google's network management protocol (gNMI), the IP Flow Information Export (IPFIX) protocol, etc.)), etc. Similarly, one or more components (not shown) may permit an outside device to interact with one or more of the router protocol process(es) 830, the label-based forwarding protocol process(es) 840, the interface process(es) 850, configuration database(s) 860, and the chassis process(es) 870, via programmatic API(s) (e.g. gRPC) 856. Such processes may send information to an outside device via streaming telemetry. In this way, one or more ANHs consistent with the present description may be configured onto a router, such as an ASBR for example. That is, channels such as user CLI 854, SNMP 885, configuration API(s) (e.g. Netconf/XML/YANG, so an external computer system can be used to provide configuration information) 852, and/or programmatic API(s) to routing protocol process (e.g., Google's remote procedure call (gRPC) protocol, so an external software application can directly create and manipulate states of routing protocol process) 856 may be used to instantiate the ANH within the configuration database(s) 860.

The packet forwarding component 890 may include a microkernel 892, interface process(es) 893, distributed ASICs 894, chassis process(es) 895 and forwarding (e.g., route-based and/or label-based) table(s) 896.

Figure 8:
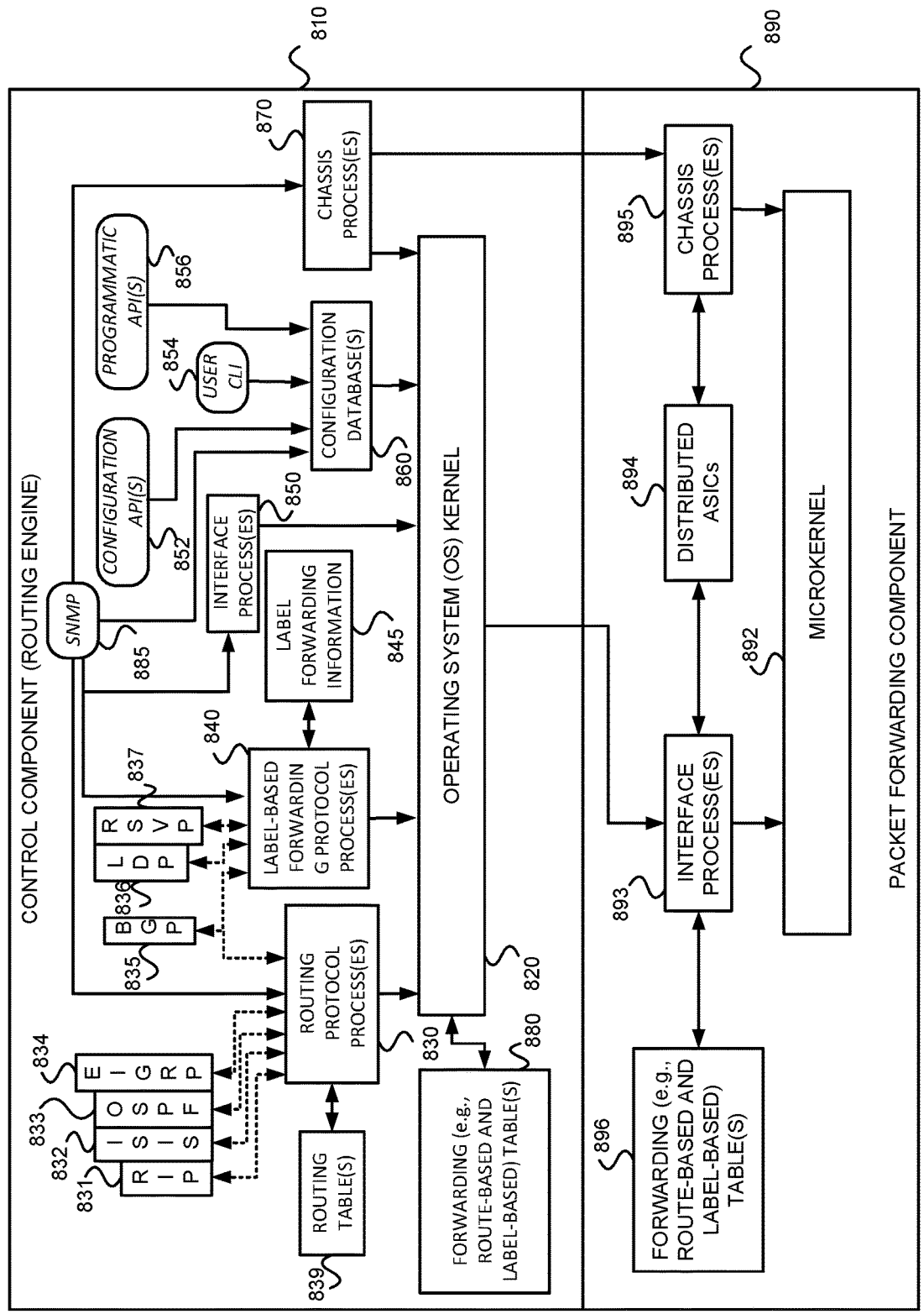
FIG. 8 is a block diagram of an example router on which the example methods of the present description may be implemented.

In the example router 800 of FIG. 8, the control component 810 handles tasks such as performing routing protocols, performing label-based forwarding protocols, control packet processing, etc., which frees the packet forwarding component 890 to forward received packets quickly. That is, received control packets (e.g., routing protocol packets and/or label-based forwarding protocol packets) are not fully processed on the packet forwarding component 890 itself, but are passed to the control component 810, thereby reducing the amount of work that the packet forwarding component 890 has to do and freeing it to process packets to be forwarded efficiently. Thus, the control component 810 is primarily responsible for running routing protocols and/or label-based forwarding protocols, maintaining the routing tables and/or label forwarding information, sending forwarding table updates to the packet forwarding component 890, and performing system management. The example control component 810 may handle routing protocol packets, provide a management interface, provide configuration management, perform accounting, and provide alarms. The processes 830, 840, 850, 852, 854, 856, 860 and 870 may be modular, and may interact (directly or indirectly) with the OS kernel 820. That is, nearly all of the processes communicate directly with the OS kernel 820. Using modular software that cleanly separates processes from each other isolates problems of a given process so that such problems do not impact other processes that may be running. Additionally, using modular software facilitates easier scaling.

Still referring to FIG. 8, although shown separately, the example OS kernel 820 may incorporate an application programming interface ("API") system for external program calls and scripting capabilities. The control component 810 may be based on an Intel PCI platform running the OS from flash memory, with an alternate copy stored on the router's hard disk. The OS kernel 820 is layered on the Intel PCI platform and establishes communication between the Intel PCI platform and processes of the control component 810. The OS kernel 820 also ensures that the forwarding tables 896 in use by the packet forwarding component 890 are in sync with those 880 in the control component 810. Thus, in addition to providing the underlying infrastructure to control component 810 software processes, the OS kernel 820 also provides a link between the control component 810 and the packet forwarding component 890.

Referring to the routing protocol process(es) 830 of FIG. 8, this process(es) 830 provides routing and routing control functions within the platform. In this example, the RIP 831, ISIS 832, OSPF 833 and EIGRP 834 (and BGP 835) protocols are provided. Naturally, other routing protocols may be provided in addition, or alternatively. Similarly, the label-based forwarding protocol process(es) 840 provides label forwarding and label control functions. In this example, the LDP 836 and RSVP 837 (and BGP 835) protocols are provided. Naturally, other label-based forwarding protocols (e.g., MPLS) may be provided in addition, or alternatively. In the example router 800, the routing table(s) 839 is produced by the routing protocol process(es) 830, while the label forwarding information 845 is produced by the label-based forwarding protocol process(es) 840.

Still referring to FIG. 8, the interface process(es) 850 performs configuration of the physical interfaces (Recall, e.g., 716 and 726 of FIG. 7.) and encapsulation.

The example control component 810 may provide several ways to manage the router. For example, it 810 may provide a user interface process(es) 860 which allows a system operator to interact with the system through configuration, modifications, and monitoring. The SNMP 885 allows SNMP-capable systems to communicate with the router platform. This also allows the platform to provide necessary SNMP information to external agents. For example, the SNMP 885 may permit management of the system from a network management station running software, such as Hewlett-Packard's Network Node Manager ("HP-NNM"), through a framework, such as Hewlett-Packard's OpenView. Further, as already noted above, the configuration database(s) 860 may be accessed via SNMP 885, configuration API(s) (e.g. NetConf, YANG, etc.) 852, a user CLI 854, and/or programmatic API(s) 856. Control component processes may send information to an outside device via SNMP 885, syslog, streaming telemetry (e.g., gNMI, IPFIX, etc.), etc. Similarly, one or more components (not shown) may permit an outside device to interact with one or more of the router protocol process(es) 830, the label-based forwarding protocol process(es) 840, the interface process(es) 850, and the chassis process(es) 870, via programmatic API(s) (e.g., gRPC) 856. Such processes may send information to an outside device via streaming telemetry. In this way, one or more ANHs consistent with the present description may be configured onto a router, such as an ASBR for example. That is, channels such as user CLI 854, SNMP 885, configuration API(s) (e.g. Netconf/XML/YANG, so an external computer system can be used to provide configuration information) 852, and/or programmatic API(s) to routing protocol process (e.g., gRPC, so an external software application can directly create and manipulate states of routing protocol process) 856 may be used to instantiate the ANH. In any of these ways, one or more ANHs may be configured onto the example router 800. Accounting of packets (generally referred to as traffic statistics) may be performed by the control component 810, thereby avoiding slowing traffic forwarding by the packet forwarding component 890.

Although not shown, the example router 800 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 854 via a console port, an auxiliary port, and/or a management Ethernet port. In any of these ways, one or more ANHs may be configured onto the example router 800.

The packet forwarding component 890 is responsible for properly outputting received packets as quickly as possible. If there is no entry in the forwarding table for a given destination or a given label and the packet forwarding component 890 cannot perform forwarding by itself, it 890 may send the packets bound for that unknown destination off to the control component 810 for processing. The example packet forwarding component 890 is designed to perform Layer 2 and Layer 3 switching, route lookups, and rapid packet forwarding.

As shown in FIG. 8, the example packet forwarding component 890 has an embedded microkernel 892, interface process(es) 893, distributed ASICs 894, and chassis process(es) 895, and stores a forwarding (e.g., route-based and/or label-based) table(s) 896. (Recall, e.g., the tables in FIGS. 7A-7D.) The microkernel 892 interacts with the interface process(es) 893 and the chassis process(es) 895 to monitor and control these functions. The interface process(es) 892 has direct communication with the OS kernel 820 of the control component 810. This communication includes forwarding exception packets and control packets to the control component 810, receiving packets to be forwarded, receiving forwarding table updates, providing information about the health of the packet forwarding component 890 to the control component 810, and permitting configuration of the interfaces from the user interface (e.g., CLI) process(es) 854 of the control component 810. The stored forwarding table(s) 896 is static until a new one is received from the control component 810. The interface process(es) 893 uses the forwarding table(s) 896 to look up next-hop information. The interface process(es) 893 also has direct communication with the distributed ASICs 894. Finally, the chassis process(es) 895 may communicate directly with the microkernel 892 and with the distributed ASICs 894.

In the example router 800, the example method 500 consistent with the present disclosure may be implemented in BGP component 835, and perhaps partly in the user CLI processes 854, or remotely (e.g., on the cloud) via configuration API(s) 852 and/or programmatic API(s) 856.

Figure 9:
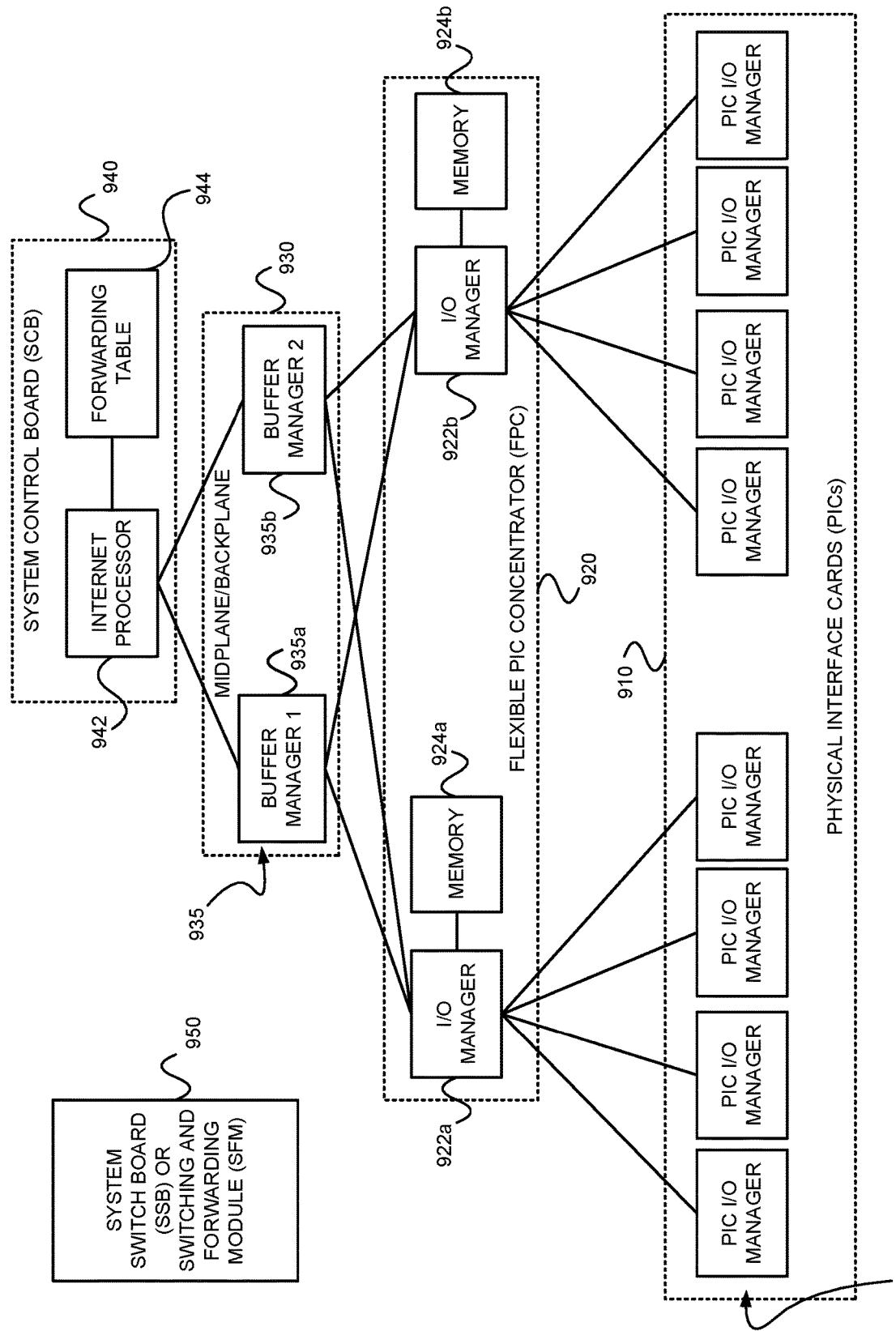
FIG. 9 is a block diagram of example distributed application specific integrated circuits ("ASICs") that may be provided in the example router of FIG. 8.

Referring back to distributed ASICs 894 of FIG. 8, FIG. 9 is an example of how the ASICS may be distributed in the packet forwarding component 890 to divide the responsibility of packet forwarding. As shown in FIG. 9, the ASICs of the packet forwarding component 890 may be distributed on physical interface cards ("PICs") 910, flexible PIC concentrators ("FPCs") 920, a midplane or backplane 930, and a system control board(s) 940 (for switching and/or forwarding). Switching fabric is also shown as a system switch board ("SSB"), or a switching and forwarding module ("SFM") 950 (which may be a switch fabric 950' as shown in FIGS. 10A and 10B). Each of the PICs 910 includes one or more PIC I/O managers 915. Each of the FPCs 920 includes one or more I/O managers 922, each with an associated memory 924 (which may be a RDRAM 924' as shown in FIGS. 10A and 10B). The midplane/backplane 930 includes buffer managers 935*a*, 935*b*. Finally, the system control board 940 includes an internet processor 942 and an instance of the forwarding table 944 (Recall, e.g., 896 of FIG. 8).

Still referring to FIG. 9, the PICs 910 contain the interface ports. Each PIC 910 may be plugged into an FPC 920. Each individual PIC 910 may contain an ASIC that handles media-specific functions, such as framing or encapsulation. Some example PICs 910 provide SDH/SONET, ATM, Gigabit Ethernet, Fast Ethernet, and/or DS3/E3 interface ports.

An FPC 920 can contain from one or more PICs 910, and may carry the signals from the PICs 910 to the midplane/backplane 930 as shown in FIG. 9.

The midplane/backplane 930 holds the line cards. The line cards may connect into the midplane/backplane 930 when inserted into the example router's chassis from the front. The control component (e.g., routing engine) 810 may plug into the rear of the midplane/backplane 930 from the rear of the chassis. The midplane/backplane 930 may carry electrical (or optical) signals and power to each line card and to the control component 810.

The system control board 940 may perform forwarding lookup. It 940 may also communicate errors to the routing engine. Further, it 940 may also monitor the condition of the router based on information it receives from sensors. If an abnormal condition is detected, the system control board 940 may immediately notify the control component 810.

Referring to FIGS. 9, 10A and 10B, in some exemplary routers, each of the PICs 910,910' contains at least one I/O manager ASIC 915 responsible for media-specific tasks, such as encapsulation. The packets pass through these I/O ASICs on their way into and out of the router. The I/O manager ASIC 915 on the PIC 910,910' is responsible for managing the connection to the I/O manager ASIC 922 on the FPC 920,920', managing link-layer framing and creating the bit stream, performing cyclical redundancy checks (CRCs), and detecting link-layer errors and generating alarms, when appropriate. The FPC 920 includes another I/O manager ASIC 922. This ASIC 922 (shown as a layer 2/layer 3 packet processing component 910'/920') takes the packets from the PICs 910 and breaks them into (e.g., 64-byte) memory blocks. This FPC I/O manager ASIC 922 (shown as a layer 2/layer 3 packet processing component 910'/920') sends the blocks to a first distributed buffer manager (DBM) 935*a* (shown as switch interface component 935*a'*), decoding encapsulation and protocol-specific information, counting packets and bytes for each logical circuit, verifying packet integrity, and applying class of service (CoS) rules to packets. At this point, the packet is first written to memory. More specifically, the example DBM ASIC 935*a*/935*a'* manages and writes packets to the shared memory 924/924' across all FPCs 920. In parallel, the first DBM ASIC 935*a*/935*a'* also extracts information on the destination of the packet and passes this forwarding-related information to the Internet processor 942/942'. The Internet processor 942/942' performs the route lookup using the forwarding table 944 and sends the information over to a second DBM ASIC 935*b'*. The Internet processor ASIC 942/942' also collects exception packets (i.e., those without a forwarding table entry) and sends them to the control component 810. The second DBM ASIC 925 (shown as a queuing and memory interface component 935*b'*) then takes this information and the 64-byte blocks and forwards them to the I/O manager ASIC 922 of the egress FPC 920/920' (or multiple egress FPCs, in the case of multicast) for reassembly. (Thus, the DBM ASICs 935*a*/935*a'* and 935*b*/935*b'* are responsible for managing the packet memory 924/9242' distributed across all FPCs 920/920', extracting forwarding-related information from packets, and instructing the FPC where to forward packets.)

The I/O manager ASIC 922 on the egress FPC 920/920' may perform some value-added services. In addition to incrementing time to live ("TTL") values and re-encapsulating the packet for handling by the PIC 910, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 922 on the egress FPC 920/920' may be responsible for receiving the blocks from the second DBM ASIC 935/935', incrementing TTL values, queuing a pointer to the packet, if necessary, before applying CoS rules, re-encapsulating the blocks, and sending the encapsulated packets to the PIC I/O manager ASIC 915.

Figure 11:
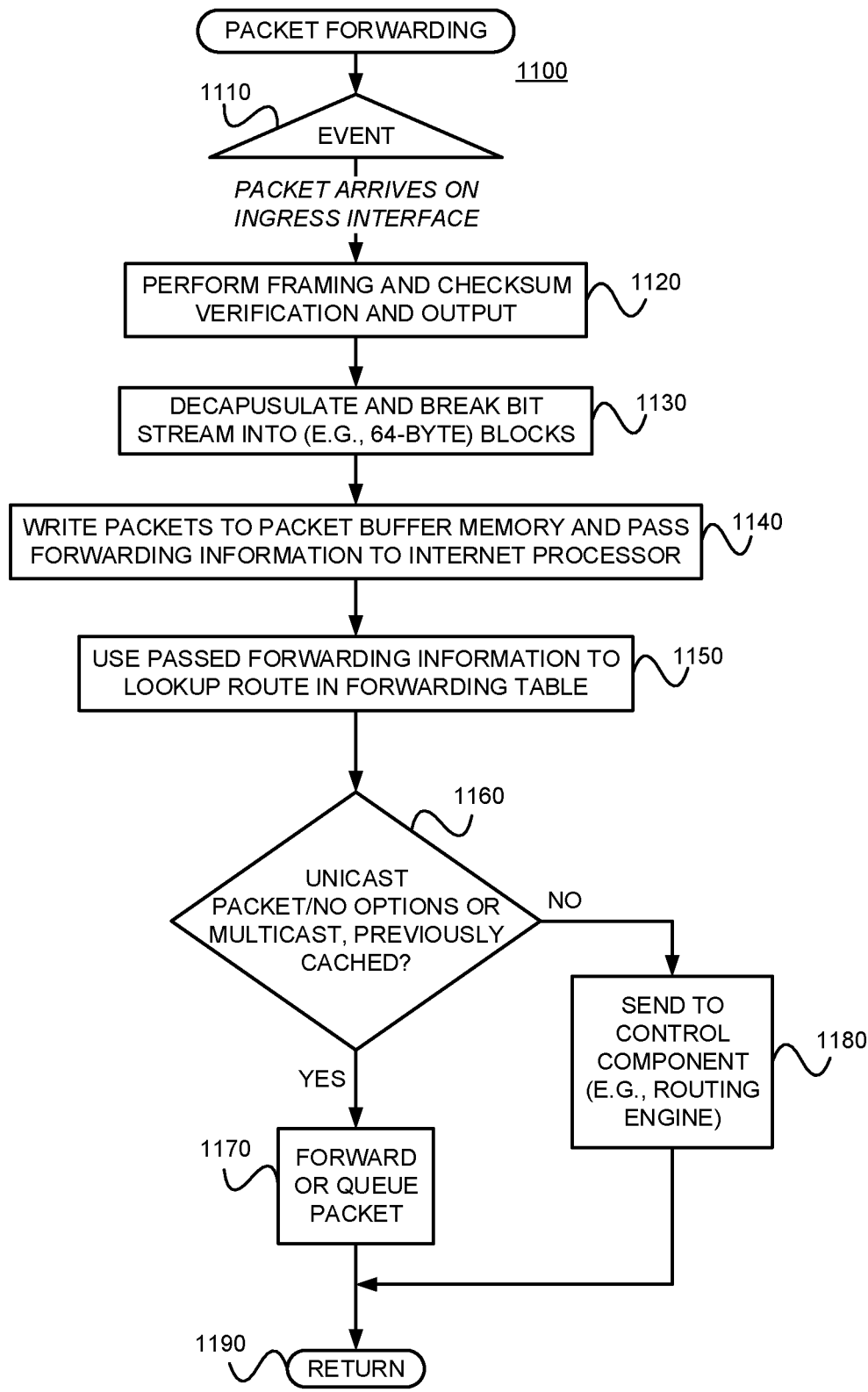
FIG. 11 is a flow diagram of an example packet forwarding method that may be implemented on any of the example routers of FIGS. 8 and 9.

FIG. 11 is a flow diagram of an example method 1100 for providing packet forwarding in the example router. The main acts of the method 1100 are triggered when a packet is received on an ingress (incoming) port or interface. (Event 1110) The types of checksum and frame checks that are required by the type of medium it serves are performed and the packet is output, as a serial bit stream. (Block 1120) The packet is then decapsulated and parsed into (e.g., 64-byte) blocks. (Block 1130) The packets are written to buffer memory and the forwarding information is passed on the Internet processor. (Block 1140) The passed forwarding information is then used to lookup a route in the forwarding table. (Block 1150) (Recall, e.g., FIGS. 7A-7D.) Note that the forwarding table can typically handle unicast packets that do not have options (e.g., accounting) set, and multicast packets for which it already has a cached entry. Thus, if it is determined that these conditions are met (YES branch of Decision 1160), the packet forwarding component finds the next hop and egress interface, and the packet is forwarded (or queued for forwarding) to the next hop via the egress interface (Block 1170) before the method 1100 is left (Node 1190) Otherwise, if these conditions are not met (NO branch of Decision 1160), the forwarding information is sent to the control component 810 for advanced forwarding resolution (Block 1180) before the method 1100 is left (Node 1190).

Referring back to block 1170, the packet may be queued. Actually, as stated earlier with reference to FIG. 9, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 922 may send a request for the packet to the second DBM ASIC 935*b*. The DBM ASIC 935 reads the blocks from shared memory and sends them to the I/O manager ASIC 922 on the FPC 920, which then serializes the bits and sends them to the media-specific ASIC of the egress interface. The I/O manager ASIC 915 on the egress PIC 910 may apply the physical-layer framing, perform the CRC, and send the bit stream out over the link.

Referring back to block 1180 of FIG. 11, as well as FIG. 9, regarding the transfer of control and exception packets, the system control board 940 handles nearly all exception packets. For example, the system control board 940 may pass exception packets to the control component 810.

Although example embodiments consistent with the present disclosure may be implemented on the example routers of FIG. 7 or 8, embodiments consistent with the present disclosure may be implemented on communications network nodes (e.g., routers, switches, etc.) having different architectures. More generally, embodiments consistent with the present disclosure may be implemented on an example system 1200 as illustrated on FIG. 12.

Figure 12:
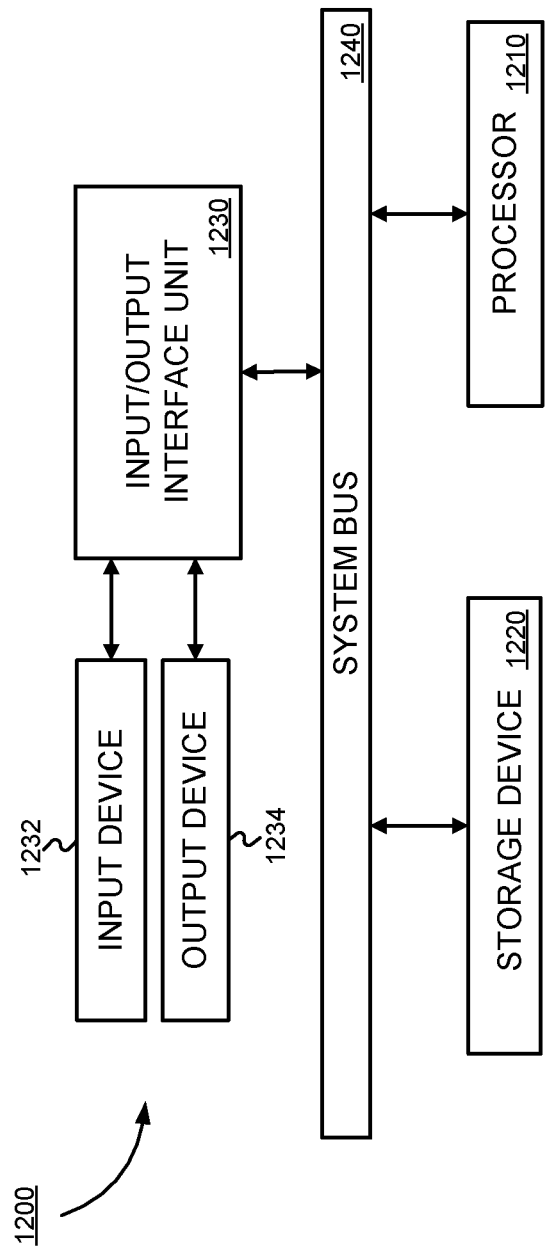
FIG. 12 is a block diagram of an example processor-based system that may be used to execute the example methods for processing

FIG. 12 is a block diagram of an exemplary machine 1200 that may perform one or more of the methods described, and/or store information used and/or generated by such methods. The exemplary machine 1200 includes one or more processors 1210, one or more input/output interface units 1230, one or more storage devices 1220, and one or more system buses and/or networks 1240 for facilitating the communication of information among the coupled elements. One or more input devices 1232 and one or more output devices 1234 may be coupled with the one or more input/output interfaces 1230. The one or more processors 1210 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 1220 and/or may be received from an external source via one or more input interface units 1230. The machine executable instructions may be stored as various software modules, each module performing one or more operations. Functional software modules are examples of components which may be used in the apparatus described.

In some embodiments consistent with the present disclosure, the processors 1210 may be one or more microprocessors and/or ASICs. The bus 1240 may include a system bus. The storage devices 1220 may include system memory, such as read only memory (ROM) and/or random access memory (RAM). The storage devices 1220 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present disclosure (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 5.4 Refinements, Alternatives and Extensions

As noted in the '929 provisional, many large-scale service provider networks use some form of scale-out architecture at peering sites. In such an architecture, each participating Autonomous System (AS) deploys multiple independent Autonomous System Border Routers (ASBRs) for peering, and Equal Cost Multi-Path (ECMP) load balancing is used between them. There are numerous benefits to this architecture, including, but not limited to, N+1 redundancy and the ability to flexibly increase capacity as needed. A cost of this architecture is an increase in the amount of state in both the control and data planes, which has negative consequences for network convergence time and scale. Configuration routing protocols (e.g., both BGP and IGP) to use ANH in a manner consistent with the present description may be used to mitigate these negative consequences. For example, using ANH allows the number of BGP paths in the control plane to be reduced and enables rapid path withdrawal (and hence, rapid network convergence and traffic restoration).

Figure 13A:
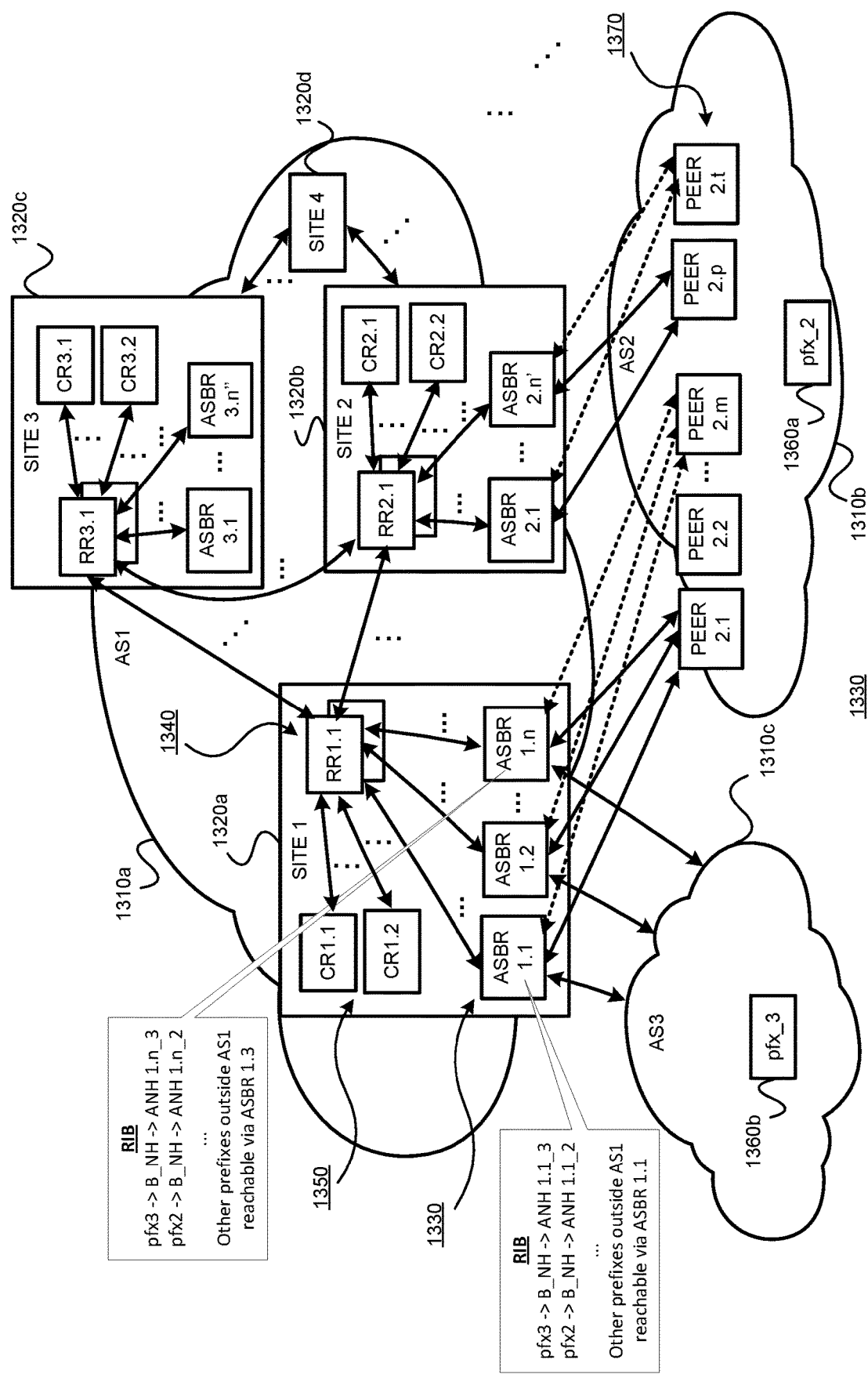
FIGS. 13A and 13B illustrate the use of an ANH for one or more eBGP learned prefixes in a manner consistent with the present description, in an example scale-out peering network architecture.
Figure 13B:
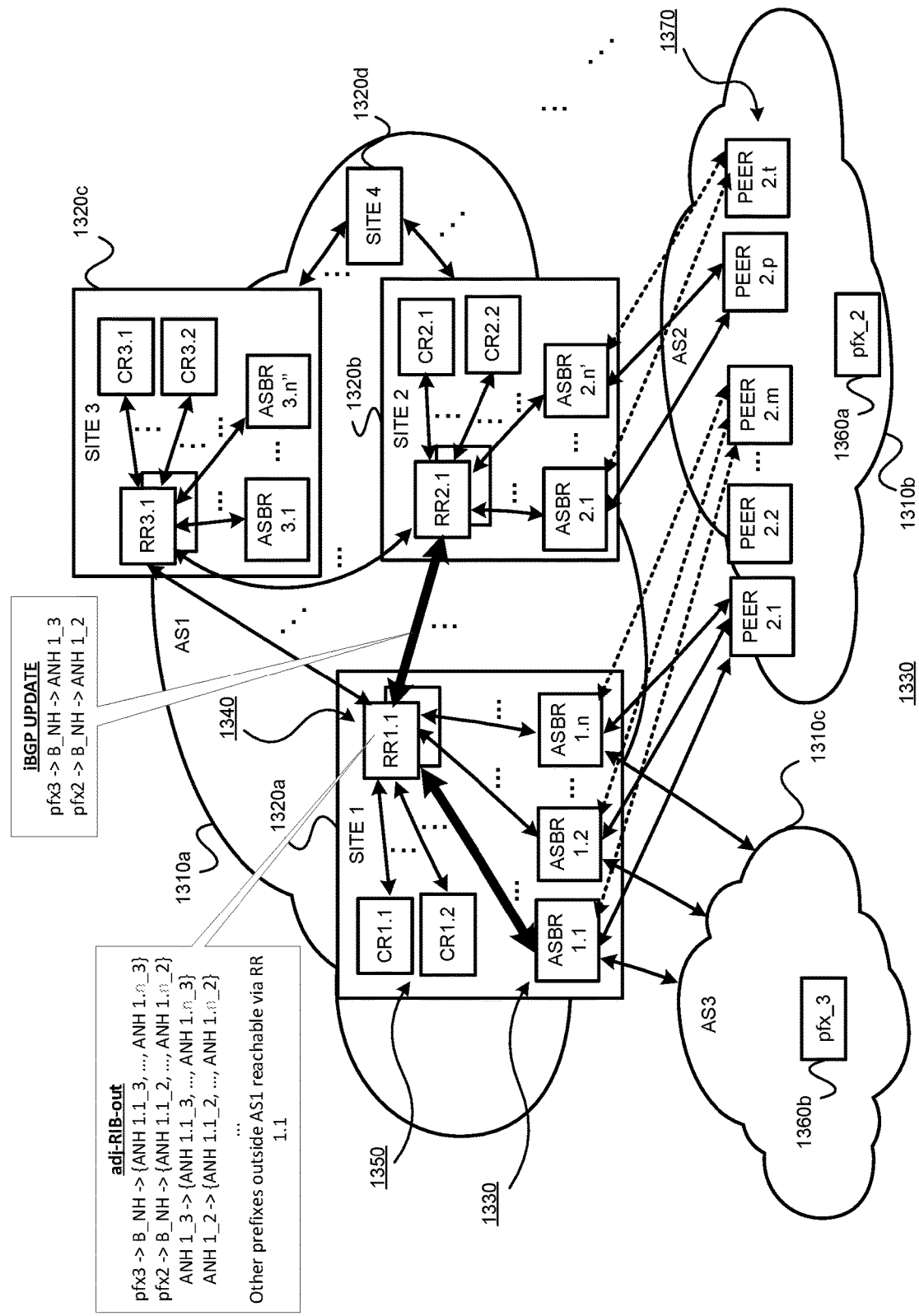

FIGS. 13A and 13B illustrate the use of an ANH for one or more eBGP learned prefixes in a manner consistent with the present description, in an example scale-out peering network architecture 1300. In these figures, the arrowed lines represent BGP sessions. The example scale-out peering network architecture 1300 includes AS1 1310a, AS2 1310b and AS3 1310c. AS2 1310b includes prefix pfx2 1360a, while AS3 1310c includes prefix pfx3 1360b. AS1 1310a includes four (4) sites, site 1 1320a, site 2 1320b, site 3 1320c and site 4 1320d. As shown, Site 1 1320a includes ASBRs 1330 (ASBR 1.1, ASBR 1.2 and ASBR 1.n), route reflector(s) 1340 (RR 1.1, . . . ) and core routers 1350 (CR 1.1 and CR 1.2). Site 2 1320b and site 3 1320c also include ASBRs (ABSR 2.1-2.n' and 3.1-3.n"), CRs (CR 2.1, 2.2, 3.1 and 3.2) and RRs (RR 2.1, . . . , 3.1 . . . ). Similarly, site 4 includes ASBR 4.1, ASBR 4.2 and ASBR 4.n, route reflector(s) (RR 4.1, . . . ) and core routers (CR 4.1 and CR 4.2) (not shown).

AS2 1310b includes peer devices (PEER 2.1, . . . , PEER 2.t) 1370 that may have an eBGP session with one or more of the ASBRs of site 1 1320a, site 2 1320b, and/or site 3 1320c, though not all sessions are shown.

In traditional configurations such as those described with reference to FIGS. 3A-4B above, the meaning of the BGP-NH is either: (a) an egress interface in the case of next-hop-unchanged configuration; or (b) an egress ASBR in the case of next-hop-self configuration. The meaning of ANH is more context-dependent. As a first example, consider an (egress ASBR, peer AS) pair. In this case, ANH should be advertised into the IGP if, and only if, the given egress ASBR has at least one eBGP session in the "ESTABLISHED" state with the given peer AS, and the EoR marker has been received on that session. This is referred to as the ASBR-Peer AS ANH (AP-ANH). AP-ANH is described in further detail in § 5.4.1 below. As a second example, consider an (egress site in local AS, peer AS) pair, where a "site" may include multiple ASBRs. The ANH should be advertised into the IGP if, and only if, at least one ASBR of the given site has at least one eBGP session in the "ESTABLISHED" state with the given peer AS, and the EoR marker has been received on this session. This is referred to as the Site-Peer AS ANH (SP-ANH). SP-ANH is described in further detail in § 5.4.2 below.

Note that reachability of the ANH address in the IGP depends on eBGP session state and not inter-AS interface state, although of course, interface state may impact session state. The manner in which the IP route to the ANH address is instantiated on an ASBR and inserted into the IGP on particular device is a matter of local implementation.

§ 5.4.1 (Egress ASBR-PEER AS) Abstract Next Hop (AP-ANH)

The AP-ANH is unique to an ASBR and its peer AS. For example, in the network of FIG. 13A, ASBR 1.1 could have two AP-ANHs assigned—one for its peering with AS2 (i.e., ANH1.1_2) and the other for peering with AS3 (i.e., ANH1.1_3). Similarly, ASBR 1.n could have two AP-ANHs assigned—one per peer AS (i.e., ANH1.n_2 and ANH1.n_3), with values different from the AP-ANH of ASBR 1.1, and so on. All AP-ANHs are exported into the IGP by their ASBRs. Each ASBR advertises only one path per prefix to its RR, with the BGP-NH set to the appropriate AP-ANH. The RR may propagate the advertised path through its corresponding AS by means of iBGP ADD-PATH. Consequently, the number of paths learned per prefix is equal to number of ASBRs servicing a given peer AS. In the network as of FIG. 13B, for AS2 prefixes, this would be n from site 1 1320a+n' from site 2 1320b paths per prefix. This sets the scale requirements of this solution to be on par with next-hop-self. However, thanks to the properties of ANH, more failures are covered by prefix-independent techniques, as withdrawal of the ANH from the IGP makes the BGP-NH unresolvable.

Provided that all ASBRs in a given site (e.g., site 1320a in FIGS. 13A and 13B) receive the same routing information from their peer AS (e.g., AS2), in non-faulty conditions, one could consider setting the ANH value on all ASBRs the same. However, failure(s) can create situations when multiple ASBRs will have a session in the "ESTABLISHED" state with a given peer AS, but some prefixes would be learned from eBGP only on a subset of these ASBRs. To avoid problems in this situation, the per-ASBR AP-ANH should be advertised into the IGP and ASBRs need to set the AP-ANH as the BGP-NH when advertising routes to the site's RRs. However, for iBGP path advertisement being propagated beyond the site (e.g., into the RR mesh), the BGP-NH may be replaced by another ANH value; namely, the Site-Peer AS ANH (SP-ANH), which is further discussed in § 5.4.2 below. Referring to FIG. 13B, an ANH may be ASBR specific, or site specific. For example, ANH 1_2 represents, indirectly, all sessions with AS2 1310b from all ASBRs 1.x 1330. When RR 1.1 1340 advertises to other RR's in other sites, it may change B_NH from ASBR specific ANH (e.g., ANH 1_2) to site specific ANH (e.g., ANH 1_x).

§ 5.4.2 (SITE-PEER AS) Abstract Next Hop (SP-ANH)

The AP-ANH works on an ASBR level. From a given local AS perspective, the number of ANH is proportional to the number of pairs of ASBRs and ASes each of them peers with. With hundreds of peer ASes, tens of sites and ~10 ASBRs per site, the number of AP-ANH may scale into the thousands. At the same time, it might not be necessary or even desirable for every BGP speaker in the network to have visibility to every path down to individual egress ASBR granularity. With symmetrical multiplane backbone and/or leaf-spine designs (See, e.g., FIGS. 14A and 14B.), it is sufficient that BGP speakers on other sites have information that a given site (e.g., site1 1320a in FIG. 13) has at least one ASBR with an "ESTABLISHED" session to the peer AS (AS2). For example, in the network of FIG. 13A, even if ASBR3.1 has only one path to Pfx2 1360a in AS2 1310b with its BGP-NH equal to the ANH of ASBR1.1, ASBR3.1 resolves the BGP-NH in the IGP and spreads traffic among all CRs on site 3 1320c. Thus, traffic will be delivered to CR1.x at site 1 1320a. As long as CR1.x has visibility to all paths, traffic can be distributed equally to all site 1 ASBRs.

At the same time, when multiple paths are available on BGP speakers, every change is propagated, with consequent transmission and processing costs on all BGP speakers across the network. This will be true even if the route change doesn't impact the forwarding plane. For example, in the network of FIG. 13A, even if ASBR3.1 has N paths with BGP-NHs set to the ANHs of ASBR1.1, ASBR1.n, ASBR3.1 will resolve those BGP-NHs in the IGP and spread traffic among all CRs of site 3 1320c. When one of the egress ASBRs (say ASBR1.2) loses its connectivity to the peer AS, the affected BGP routes (those with BGP-NH equal to AP-ANH of ASBR1.2) are withdrawn from all BGP speakers (e.g., ASBR3.1) of the network. All BGP speakers perform path selection and possibly update their forwarding data structures. Since the actual forwarding paths do not change, all this work represents unnecessary churn.

To avoid the above drawbacks, the RR of a given site (e.g., site 1 1320a in FIG. 13B), when re-advertising a BGP path learned from its ASBR client, modifies the BGP-NH to another abstract value; namely, the Site-Peer AS Abstract NH (SP-ANH). This value is unique per (site, peer AS) pair, and is shared by all RRs of a given site. With this modification, it is sufficient that inter-site iBGP sessions carry only one path per prefix (no ADD-PATH needed). Consequently, BGP RIB scale is reduced significantly. This frees up memory, reduces the amount of data RRs need to exchange, and mitigates churn. The BGP speakers in other sites of AS 1 1310a need to resolve SP-ANH in order to build their local FIBs. Therefore, the SP-ANH has to be present in the IGP; that is, some router(s) in the local site (RR, ASBR or CR) need to inject it into the IGP. While the selection of role that is responsible of SP-ANH injection is discussed below, in any case, the SP-ANH should be reachable in the IGP if, and only if, at least one of AP-ANH (for the same peer AS and ASBR belonging to given site) is reachable. FIG. 3 of the '929 provisional illustrates routing information flow in a network such as that of FIG. 2 of the '929 provisional (which is similar to FIG. 13A).

§ 5.4.3 Assignment of Abstract Next Hops

More details of how abstract next hops can be injected in several different common network architectures are discussed in §§ 5.4.3.1-5.4.3.3 below.

§ 5.4.3.1 Native IP Networks

In native IP networks every router, including core routers, has full BGP routing information and forwards each packet based on destination IP lookup. Provided that all routers at an egress site receive multiple paths with BGP-NH set to AP-ANH (and not SP-ANH), the human operator may decide which node (RR, ASBR or CR) will inject the SP-ANH route into the IGP. One operator may believe that injection of SP-ANH by ASBRs may be simpler, as it will be done by the same procedure and policy as injection of AP-ANH. Another operator may prefer injection at RR, as it limits the number of configuration touch-points.

§ 5.4.3.2 MPLS

First, assume that identical BGP address space and paths are received on all ASBRs. In the MPLS network, since traffic is carried over LSP tunnels, the SP-ANH should be injected into the IGP by a node that has the ability to perform an IP lookup. This eliminates the RR, and possibly CRs (in "BGP-free core" architectures). Instead, all ASBRs may be used to insert SP-ANH addresses into the IGP. In the case of LDP-based networks, this is sufficient. The CR will create an ECMP forwarding structure for labels of SP-ANH FEC coming from other sites. In RSVP-TE based networks, ECMP needs to happen on the ingress LSR and therefore, every BGP speaker needs to establish an LSP to every ASBR, and the SP-ANH address needs to be part of the FEC for its respective LSP. If SP-ANH is used as an RSVP (signaling) destination, some other means (such as affinity groups) needs to be used to ensure the desired 1:1, LSP to egress ASBR, mapping. Note that if MPLS is used to advertise an ANH, it should do so with an implicit-null or explicit-null label (Penultimate-Hop-Popping or Ultimate-Hop-Popping, respectively). This is to facilitate IP-lookup for packets coming from the core network going towards the device reachable through the peer-ASBR nodes. Non-null label can also be used, but only if the ANH identifies a set of eBGP sessions such that the eBGP sessions are providing exactly equal/same set of prefixes (e.g., when eBGP over parallel links between two routers is used).

Alternatively, assume that different address space sets or paths are received on different ASBRs. If the set of prefixes received from a given peer AS by one ASBR is different from the set received by another one, a combination of SP-ANH and MPLS-based load balancing on a CR may lead to a situation in which an IP packet will be directed to an ASBR that lacks external routing information, and consequently can't forward traffic directly out of the AS. Similarly, if path attributes for a given prefix received by one ASBR are different from those received by another, again, packets can be directed to the "wrong" ASBR. In this case the ASBR would use the iBGP route it learned from another ASBR of the same site (via RR, with AP-ANH) and forward traffic over an LSP to the "correct" ASBR. This extra hop constitutes a sub-optimal traffic path through the network.

Figure 1A:
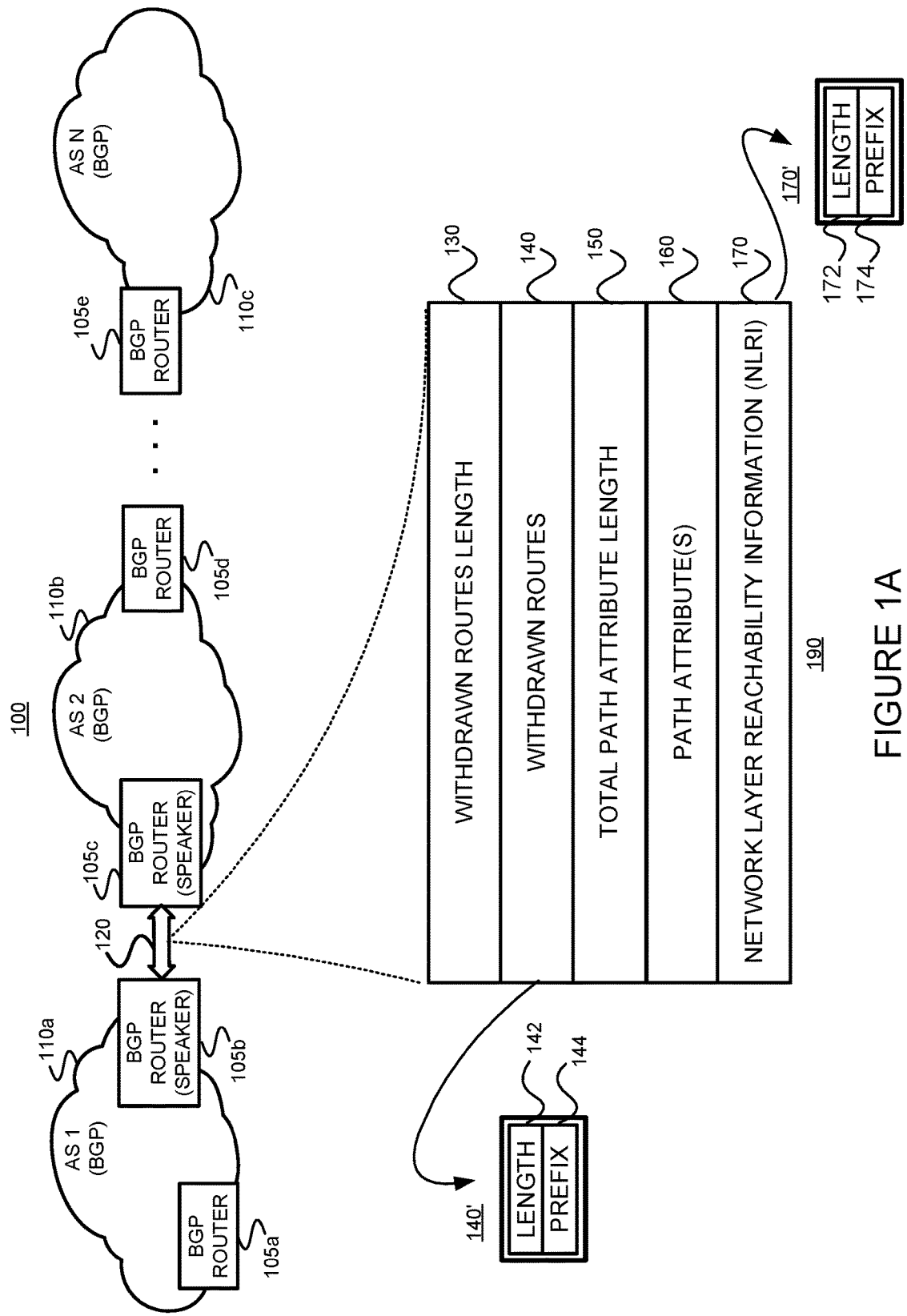
FIG. 1A illustrates parts of a conventional BGP update message sent from one BGP router in one autonomous system (AS) to other BGP router in another AS, and FIG. 1B illustrates parts of a path attribute field in such a BGP update message.
Figure 1B:
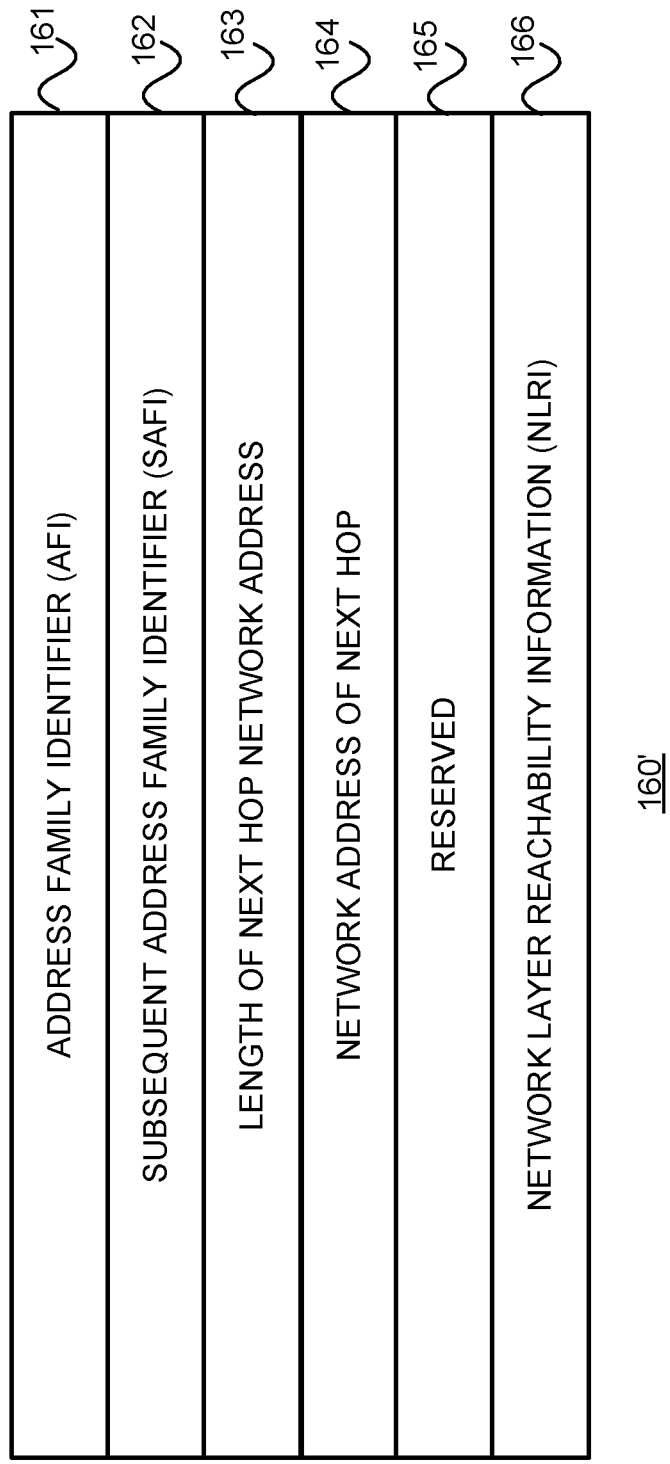
Figure 2:
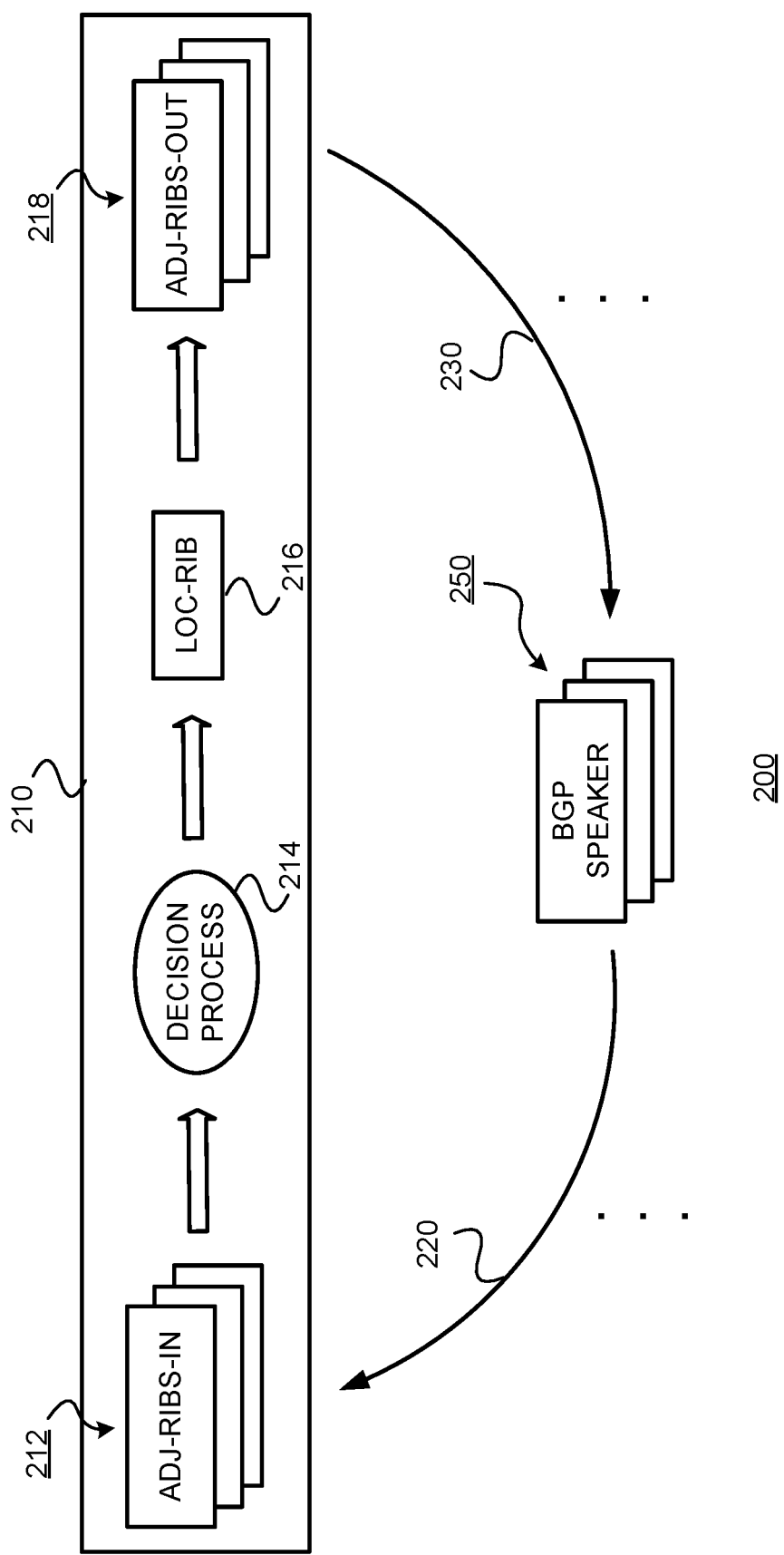
FIG. 2 illustrates a conventional BGP RIB model in which a BGP speaker interacts with other BGP speakers (peers).

For example, in the network of FIG. 2 of the '929 provisional, assume that prefix P2 is advertised to BR1.2-BR1.N by AS2, but not to BR1.1. Border router BR3.1 has a BGP best route to P2 with its BGP-NH set to the SP-ANH of (site 1, AS2). It resolves this BGP-NH (SP-ANH) by ECMP over N MPLS LSPs, terminating on BR1.1-BR1.N. So, some packets are forwarded by BR3.1 over an LSP via CR1.x and terminated on BR1.1. Border router BR1.1 has no external route to P2, but it has (N−1) iBGP routes to P2 with BGP-NHs equal to the AP-ANHs of BR1.2-BR1.N. Therefore, BR1.1 performs an IP lookup and forwards this packet over LSPs via CR1.x and terminated on BR1.2-BR1.N. Traffic is U-turned on BR1.1 and traverses CRs at site 1 twice.

Such asymmetry may be considered acceptable by the provider, as long as it's a transient condition. However, in the general case, such a situation could be persistent as the result of intentional configuration on the peer AS's ASBRs. Therefore, a better solution would be to insert the SP-ANH into the IGP on CRs. In this case, CRs need to perform forwarding based on destination IP lookup. Therefore, CRs would have to be able to learn and handle large IP routing and forwarding tables—at least all prefixes learned from peer ASes by the local ASBRs.

§ 5.4.3.3 Spring

First, assume that identical BGP address space and paths are received on all ASBRs. For SPRING based networks, one can take advantage of the unique capability of Anycast-SID. (See, e.g., "Segment Routing Architecture," *Request for Comments* 8402 (Internet Engineering Task Force, July 2018)(referred to as "RFC 8402" and incorporated herein by reference).) The ASBRs of a single site allocate an Anycast-SID for each SP-ANH address. This SID can be used as the only SID by an ingress BGP speaker or, if a TE routed path is desired, depending on TE constraints, the TE controller can provision a SPRING path with the Anycast-SID at the end, instructing the CR to perform load balancing among connected ASBRs.

Alternatively, assume that different address space sets or paths are received on different ASBRs. Similar to a classic MPLS environment, such a situation may lead to suboptimal routing (redirecting from one ASBR to another), or may require the CR (instead of ASBR) to insert the SP-ANH into the IGP and generate a PREFIX-SID (or Anycast-SID if there is more than one CR) for it.

§ 5.4.4 Use of ANH in Clos-Network Data Center Fabrics

Referring to FIGS. 14A and 14B, in data center (DC) fabrics that use eBGP IP-CLOS, a link failure (e.g., C1-S1 link) can cause routing loops (e.g., between B1 and C2) until global convergence occurs after the link failure (namely C1 withdraws to B1 all prefixes learned from S1). ANH can be use in such a case to minimize traffic loss. For example, as shown in FIG. 14A, C1 can use an ANH to represent 51, and re-advertise S1-routes with ANH-self to B1. Though no IGP exists, the ANH can be advertised in BGP inet-unicast itself such that BGP-over-BGP recursive route-resolution is used at B1 to resolve "service prefixes over ANH/32 (or ANH/128)." As soon as the ANH is withdrawn as shown in FIG. 14B, the upstream node B1 can start converging traffic for service prefixes away from C1, to C2 without waiting for per-service-prefix BGP withdrawals from C1. The ANHs can be autoconfigured to ease configuration overhead in such IP-CLOS environments.

§ 5.5 Conclusions

Abstract Next Hop (ANH), as described above, does not require any changes to the BGP protocol itself. Rather, ANH is an architectural solution to network configuration. It uses the capabilities of existing protocols while achieving higher scale and faster routing convergence (especially in a network configured with scale-out peering sites).

When same ANH is used to represent a set of peers, it also reduces route-scale and routing-churn in the iBGP-network. This is because one path can be advertised (or withdrawn) instead of advertising (or withdrawing) multiple paths.

ANH can also be used to drain traffic from iBGP-core, for example when an eBGP peer is being taken out for maintenance.

What is claimed is:

1. A router configured as an autonomous system border router (ASBR) in a local autonomous system (AS), the router comprising:
   a) a control component for communicating and computing routing information, the control component running a Border Gateway Protocol (BGP) and peering with at least one BGP peer device in an outside autonomous system (AS) different from the local AS; and
   b) a forwarding component for forwarding packets using forwarding information derived from the routing information computed by the control component,
      wherein the control component (1) receives reachability information for at least one external prefix, each of the at least one external prefix corresponding to a device located outside the local AS, and (2) associates the at least one external prefix, as a BGP next hop (B_NH), with an abstract next hop (ANH) that identifies either
      (A) a set of at least two BGP (eBGP) sessions, wherein each of the at least two eBGP sessions is between the ASBR and a BGP peer device through which the device corresponding to one of the at least one external prefix located outside the local AS is reachable, the BGP peer device being located in the outside AS, or
      (B) an eBGP session between the ASBR and a BGP peer device through which each of at least two devices corresponding to at least two external prefixes is reachable.

2. The router of claim 1 wherein the ANH is an IP address.

3. The router of claim 2 wherein the control component further advertises the ANH using an Interior Gateway Protocol (IGP) of the local AS.

4. The router of claim 2 wherein the control component further advertises the ANH via a Multiprotocol Label Switching (MPLS) label distribution control protocol of the local AS.

5. The router of claim 1 wherein each eBGP session in the set of BGP sessions identified by the ANH is between the router and at least two peer devices in the outside AS through which the device is reachable.

6. The router of claim 1 wherein the set of BGP sessions identified by the ANH includes (1) a BGP session between the router and at least one peer device in the outside AS through which the device is reachable, and (2) a BGP session between at least one other ASBR router in the local AS and at least one peer device in the outside AS through which the device is reachable.

7. The router of claim 1 wherein the set of BGP sessions identified by the ANH includes a BGP session between the router and at least two peer devices in at least two ASes outside the local AS through which the device is reachable.

8. The router of claim 1 wherein the set of BGP sessions identified by the ANH includes (1) a BGP session between the router and at least one peer device in an AS outside the local AS through which the device is reachable, and (2) a BGP session between at least one other ASBR router in the local AS and at least one peer device in an AS outside the local AS through which the device is reachable.

9. The router of claim 1 wherein the control component further advertises to a route reflector (RR) within the local AS, the external prefix with the abstract next hop as a single path, regardless of how many eBGP sessions are associated with the ANH and regardless of whether the external prefix was learned from more than one of the eBGP sessions.

10. The router of claim 1 wherein the control component further advertises the external prefix with the abstract next hop as a single path, regardless of how many eBGP sessions are associated with the ANH and regardless of whether the external prefix was learned from more than one of the eBGP sessions.

11. The router of claim 1 wherein abstract next hop (ANH) that identifies an eBGP session between the ASBR and a BGP peer device through which each of at least two devices corresponding to at least two external prefixes is reachable.

12. A non-transitory storage medium provided on an autonomous system border router (ASBR) in a local autonomous system (AS) storing a data structure comprising:
    a) an external prefix corresponding to a device located outside the local AS; and
    b) an abstract next hop Internet protocol (IP) address (ANH) that (1) is associated with the external prefix, and (2) identifies a set of BGP (eBGP) sessions that contains at least one eBGP session, each of the at least one eBGP session being between the ASBR and a BGP peer device in an AS outside the AS, wherein the device located outside the local AS is reachable via the BGP peer device.

13. The non-transitory storage medium of claim 12, wherein the ANH does not identify, and is not associated with, any object other than the at least BGP session with which it is associated.

14. The non-transitory computer-readable storage medium of claim 12 wherein the ANH is selected from a set of Address Families and Sub-Address Families comprising: (A) Internet Protocol version 4 (IPv4), (B) Internet Protocol version 6 (IPv6), (C) Virtual Private Network version 4 (VPNv4), (D) Virtual Private Network version 6 (VPNv6), (E) layer 2 Virtual Private Network/Virtual Private LAN Service (L2VPN/VPLS) and (F) Ethernet Virtual Private Network (EVPN).

15. A method for configuring an autonomous system border router (ASBR) in a local autonomous system (AS) having at least one BGP peer device in an outside autonomous system (AS) different from the local AS, the method comprising:
    a) receiving reachability information for at least one external prefix, each of the at least one external prefix corresponding to a device located outside the local AS; and
    b) associating with the at least one external prefix, as a BGP next hop (B_NH), an abstract next hop Internet protocol (IP) address (ANH) that (1) is associated with the external prefix, and (2) identifies either
       (A) a set of at least two BGP (eBGP) sessions, wherein each of the at least two eBGP sessions is between the ASBR and a BGP peer device through which the device corresponding to one of the at least one external prefix located outside the local AS is reachable, the BGP peer device being located in the outside AS, or
       (B) an eBGP session between the ASBR and a BGP peer device through which each of at least two devices corresponding to at least two external prefixes is reachable.

16. The method of claim 15 wherein the ANH does not identify, and is not associated with, any object associated with the prefix, other than the at least BGP sessions with which it is associated.

17. The method of claim 15 wherein the reachability information for the external prefix is received via a user interface of the ASBR, and wherein the ANH is associated with the external prefix via the user interface.

18. The method of claim 15 wherein the reachability information for the external prefix and the ANH associated with the external prefix are received as manually-entered configuration information stored on a non-transitory computer-readable storage medium.

19. The method of claim 15 wherein the abstract next hop (ANH) that identifies a set of at least two BGP (eBGP) sessions, wherein each of the at least two eBGP sessions is between the ASBR and a BGP peer device through which the device corresponding to one of the at least one external prefix located outside the local AS is reachable, the BGP peer device being located in the outside AS.

20. The method of claim 15 wherein the abstract next hop (ANH) that identifies an eBGP session between the ASBR and a BGP peer device through which each of at least two devices corresponding to at least two external prefixes is reachable.

* * * * *